(12) United States Patent
Bertrand

(10) Patent No.: US 10,621,741 B2
(45) Date of Patent: Apr. 14, 2020

(54) SYSTEM AND METHOD FOR A DIGITAL IMAGE SEXTANT

(71) Applicant: William Bertrand, Belleville, IL (US)

(72) Inventor: William Bertrand, Belleville, IL (US)

(73) Assignee: William Bertrand, Belleville, IL (US)

( * ) Notice: Subject to any disclaimer, the term of this patent is extended or adjusted under 35 U.S.C. 154(b) by 0 days.

(21) Appl. No.: 16/055,055

(22) Filed: Aug. 4, 2018

(65) Prior Publication Data

US 2019/0043211 A1 Feb. 7, 2019

Related U.S. Application Data

(60) Provisional application No. 62/541,724, filed on Aug. 6, 2017, provisional application No. 62/541,667, filed on Aug. 5, 2017.

(51) Int. Cl.
| | |
|---|---|
| *G06T 7/50* | (2017.01) |
| *G06T 7/80* | (2017.01) |
| *G06T 7/73* | (2017.01) |
| *G06T 5/00* | (2006.01) |
| *G01C 21/02* | (2006.01) |
| *H04N 5/232* | (2006.01) |
| *H04N 5/77* | (2006.01) |
| *H04N 9/82* | (2006.01) |
| *G01C 1/08* | (2006.01) |
| *G01C 25/00* | (2006.01) |
| *H04N 5/907* | (2006.01) |
| *G06F 16/583* | (2019.01) |

(52) U.S. Cl.
CPC .................. *G06T 7/50* (2017.01); *G01C 1/08* (2013.01); *G01C 21/025* (2013.01); *G01C 25/00* (2013.01); *G06T 5/006* (2013.01); *G06T 7/74* (2017.01); *G06T 7/80* (2017.01); *H04N 5/23216* (2013.01); *H04N 5/77* (2013.01); *H04N 9/8205* (2013.01); *G06F 16/5838* (2019.01); *G06T 2207/20092* (2013.01); *H04N 5/907* (2013.01)

(58) Field of Classification Search
CPC .... G06T 7/50; G06T 7/80; G06T 7/74; G06T 5/006; H04N 5/23216
See application file for complete search history.

(56) References Cited

U.S. PATENT DOCUMENTS

| | | |
|---|---|---|
| 4,694,584 A | 9/1987 | Mills |
| 7,349,803 B2 | 3/2008 | Belenkii et al. |
| 8,355,868 B2 | 1/2013 | Brace |

(Continued)

*Primary Examiner* — Mishawn N. Hunter
(74) *Attorney, Agent, or Firm* — Randolph Bretton; The Law Office of Randolph Bretton

(57) ABSTRACT

Disclosed is a system of navigation that is not dependent on man-made satellites. Disclosed is a digital imaging system that may be calibrated using known angular distances and then used to determine unknown angular distances, including the angular distance of celestial bodies above the user's horizon. The digital imaging system may be used in conjunction with a celestial database to determine lines of position and establish a fix revealing the geographic location of the user. The system is expected to be most useful when employed on vessels at sea, including aircraft, and may also be useful on land. The invention offers an alternative to Global Positioning Systems, which are subject to inactivation by governments or traditional mechanical-optical sextants, which are time consuming and cumbersome to use.

13 Claims, 27 Drawing Sheets

(56) References Cited

U.S. PATENT DOCUMENTS

| | | | |
|---|---|---|---|
| 2007/0117078 A1 | 5/2007 | Bruns et al. | |
| 2007/0159390 A1* | 7/2007 | Kim | G09B 27/04 342/357.29 |
| 2009/0225155 A1 | 9/2009 | Hirotani | |
| 2012/0198710 A1* | 8/2012 | Lupovka | G01C 21/02 33/228 |
| 2014/0160250 A1* | 6/2014 | Pomerantz | H04N 5/23229 348/47 |
| 2016/0012290 A1 | 1/2016 | Lucas | |

* cited by examiner

Calibration Image: Black & White Negative (Cassiopeia)

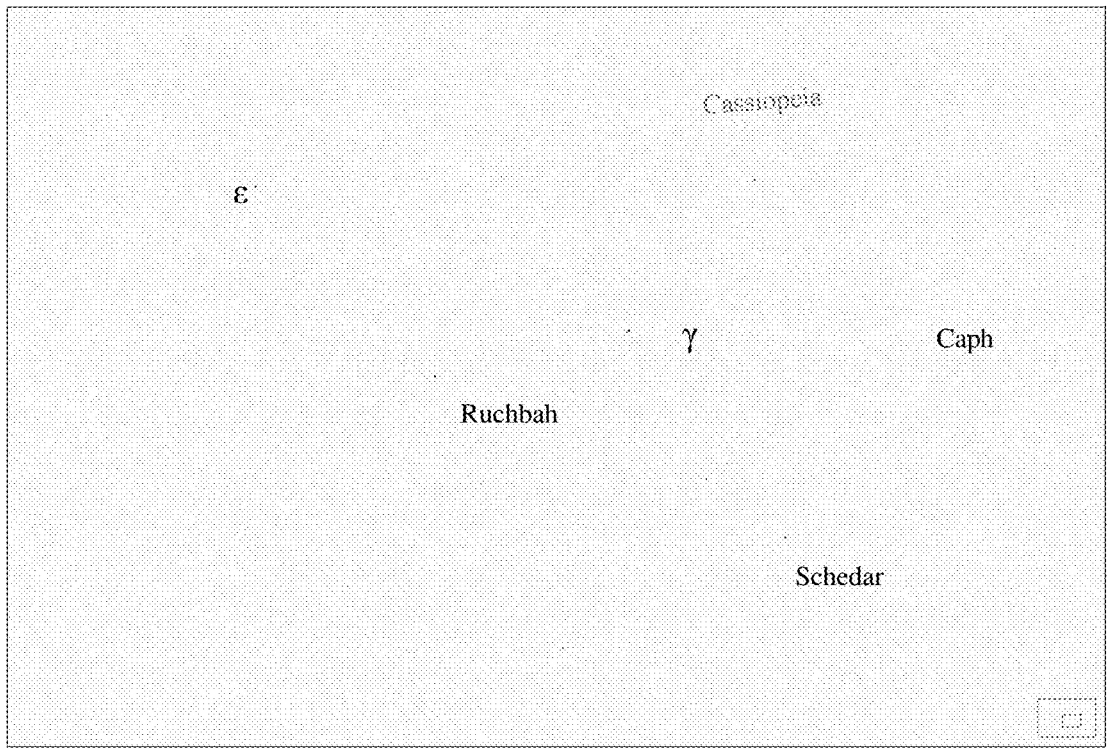
A Zoom Detail of Calibration Image: Black & White Negative (Cassiopeia) (Above) & a star chart for reference (Below)
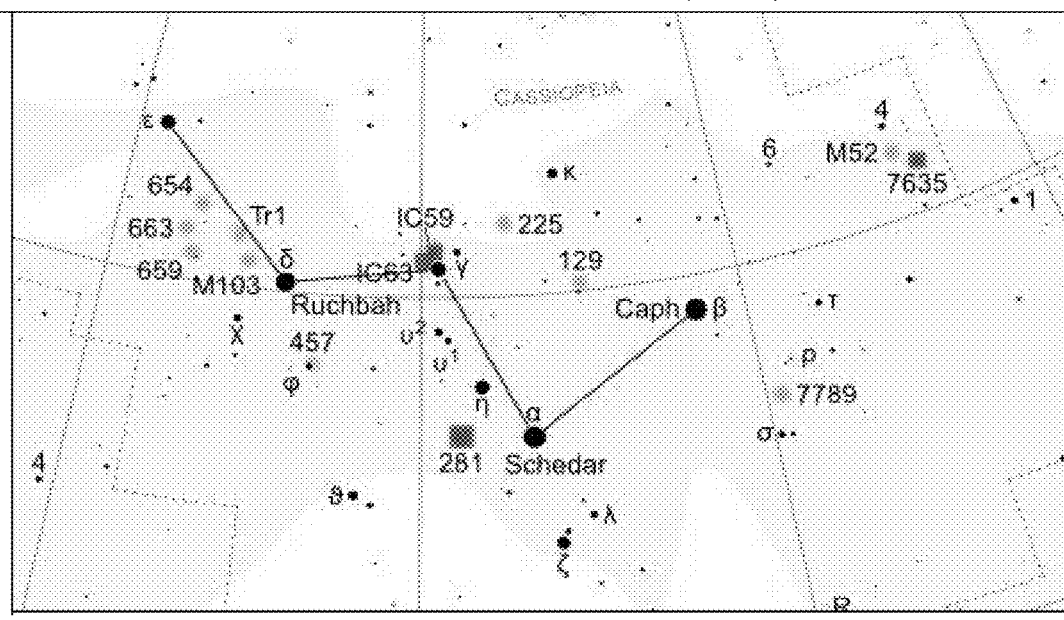
Fig. 4

Best B    : 0.030510649999999934
Best A    : 0.0015716392857142631
Best C    : 2.34465942857143E-4
Best PPD  : 125.57521484927834
Best Y/X  : 1.0

Sum of Error: 0.031077124374557563
Ave Error    : 0.0025897603645400244
Resolution   : 0.007378082447914517
Err/Res      : 0.3510072410849846

Pixel [x=3809, y=2580] Fit_Error: 0.0
Pixel [x=5700, y=1283] Fit_Error: -0.00427
Pixel [x=2977, y=2258] Fit_Error: 9.0E-5
Pixel [x=2215, y=2248] Fit_Error: -3.1E-4
Pixel [x=5802, y=37]   Fit_Error: -1.0E-4
Pixel [x=3406, y=2157] Fit_Error: -0.00713
Pixel [x=2626, y=1800] Fit_Error: -0.00391
Pixel [x=6190, y=1193] Fit_Error: 0.00545
Pixel [x=7090, y=379]  Fit_Error: 0.0
Pixel [x=2695, y=2591] Fit_Error: 0.00607
Pixel [x=2800, y=1927] Fit_Error: 0.00367
Pixel [x=5643, y=556]  Fit_Error: 7.0E-5

Segin, 542, 01:54:23.7, 63°40.20' N, 3.38
MIRPHAK, 1017, 03:24:19.4, 49°51.67' N, 1.79
27Gam Cas, 264, 00:56:42.5, 60°43.00' N, 2.47
Caph, 21, 00:09:10.7, 59°08.98' N, 2.27
ALGOL, 936, 03:08:10.1, 40°57.33' N, 2.12
Ruchbah, 403, 01:25:49.0, 60°14.12' N, 2.68
SHEDIR, 168, 00:40:30.5, 56°32.23' N, 2.23
39Del Per, 1122, 03:42:55.5, 47°47.25' N, 3.01
45Eps Per, 1220, 03:57:51.2, 40°00.62' N, 2.89
15Kap Cas, 130, 00:33:00.0, 62°55.90' N, 4.16
Achird, 219, 00:49:06.0, 57°48.95' N, 3.44
27Kap Per, 941, 03:09:29.8, 44°51.43' N, 3.8

Pixel locations of stars

Stars with their celestial coordinates

| Star | Catalog Number | Pixel X | Pixel Y | Right Ascension | Declination | Fit Error Degrees |
|---|---|---|---|---|---|---|
| 45Eps Cas | 542 | 3809 | 2580 | 01:54:23.7 | 63°40.20' N | 0.0 |
| MIRPHAK | 1017 | 5700 | 1283 | 03:24:19.4 | 49°51.67' N | -0.00427 |
| 27Gam Cas | 264 | 2977 | 2258 | 00:56:42.5 | 60°43.00' N | 9.0E-5 |
| Caph | 21 | 2215 | 2248 | 00:09:10.7 | 59°08.98' N | -3.1E-4 |
| ALGOL | 936 | 5802 | 37 | 03:08:10.1 | 40°57.33' N | 0.0 |
| Ruchbah | 403 | 3406 | 2157 | 01:25:49.0 | 60°14.12' N | -0.00713 |
| SHEDIR | 168 | 2626 | 1800 | 00:40:30.5 | 56°32.23' N | -0.00391 |
| 39Del Per | 1122 | 6190 | 1193 | 03:42:55.5 | 47°47.25' N | 0.00545 |
| 45Eps Per | 1220 | 7090 | 379 | 03:57:51.2 | 40°00.62' N | 0.0 |
| 15Kap Cas | 130 | 2695 | 2591 | 00:33:00.0 | 62°55.90' N | 0.00607 |
| 24Eta Cas | 219 | 2800 | 1927 | 00:49:06.0 | 57°48.95' N | 0.00367 |
| 27Kap Per | 941 | 5643 | 556 | 03:09:29.8 | 44°51.43' N | 7.0E-5 |

Fig. 5

Method of Calibrating the Digital Sextant and Measuring Sextant Altitudes of Celestial Bodies

Flow Chart 2

Method of determining a Fix using a calibrated Digital Sextant

Flow Chart 3

Figure 21

SYSTEM AND METHOD FOR A DIGITAL IMAGE SEXTANT

CROSS REFERENCE TO RELATED APPLICATIONS

This application claims priority to provisional application 62/541,724 filed Aug. 6, 2017, and provisional application 62/541,667, filed Aug. 5, 2017, both of which are hereby incorporated by reference in their entirety.

FIELD OF THE INVENTION

The present invention relates to methods and apparatus to measure angular distances from digital images. One embodiment of the present invention is related to the field of sextants and navigation.

BACKGROUND OF THE INVENTION

The need for an alternative and independent positioning system to GPS remains undiminished due to the vulnerability of GPS to external signal spoofing and other forms of signal disruption and denial (Pappalardi, et al., (2001). Alternatives to GPS. In OCEANS, 2001. MTS/IEEE Conference and Exhibition (Vol. 3, pp. 1452-1459). IEEE). To this end, the U.S. Navy continues to teach and practice celestial navigation. Conventional celestial navigation instruments, such as sextants, quadrants and the like, are typically mechanical-optical devices used to measure angles also called angular distances. The angular distance between two-point objects, as observed from a location different from either of these objects, is the size of the angle between the two directions originating from the observer and pointing towards these two objects. Altitude is the term of art for the angular distance of a celestial body above the observer's horizon. The term of art for the uncorrected measured angle between a celestial body, such as a star, a planet, sun, or moon and the horizon is called the "Sextant Altitude" of the body. It is difficult to accurately capture useful angular measurements like sextant altitudes with these devices because of several factors. 1) On a traditional sextant, the angle must be measured by physically altering the geometry of the device with sufficient precision, which is typically about 0.0033 degrees of arc. This usually involves multiple controls of increasing fine adjustment. 2) The measurement is often taken on a vehicle, such as a watercraft, aircraft, or the like, that is usually in motion including translation, roll, pitch, yaw and spin, making accurate manipulation of the device challenging. Taking such a measurement is so challenging, that extensive training and experience is typically required to successfully use such devices to practical effect, and still wide variation exists in the ability of practitioners. 3) The angle must be visually read off the device usually from a combination of increasingly fine scales of measurement. The combined value must then be recorded with the time of the measurement to within a second of accuracy. This will be repeated for every object measured, for a minimum of 2 but often 4 or more, to be used in determining the navigational location or "fix" as the term of art is known in the field. The recorded angles and times must then be submitted to corrections and calculations. Conditions like weather may reveal the objects for too brief a time for the sextant user to manipulate the device and capture the required angle or angles. Further, such devices require human operation, thus preventing practical autonomous celestial navigation.

While GPS is readily available it is known to be unreliable particularly in times and regions of conflict where combatants disrupt, alter, or provide false GPS signals. As such, celestial navigation is still widely practiced in spite of its challenges. Therefore, the need exists for a novel means to accurately measure angles without fine human manipulation of a sextant or similar device, and a device that is not dependent on external communications or venerable to disruption of spoofing from external singles.

SUMMARY

A system for measuring angular distance between two objects, comprising: a) an imaging device enabled to make and store a digital image of two objects separated by a known angular distance; b) a computational element, further comprising: a microprocessor, a means of user input, a means of user output, computer memory medium; and computer readable instructions enabling the computational element to: i) accept input parameters of the imaging device and image detector; ii) accept input of the known angular distance for the pixels selected to represent the two objects of known angular distance; iii) correct the pixels per arc for distortion where the pixels per arc were not constant across the image; and determine pixels per arc from the digital image and iv) store the input and determinations of as calibration parameters. The system further enabled to make and store a digital image of two objects of unknown angular distance, and said computer readable instructions further enabling the computational element to: a) accept the selection of 1 pixel representative of each object of unknown angular distance on a digital image of two objects of unknown angular distance b) apply said calibration parameters to determine the angular distance between the 2 objects of unknown angular distance; and c) output or display said angular distance determination.

The system for measuring angular distance may be in further communication with a celestial database and further comprise computer readable instructions to enable the system to accept input of known celestial bodies of known angular distance from the celestial database, as the two objects of known angular distance, for the purposes of determining and storing calibration parameters.

The system for measuring angular distance in further communication with a celestial database and further comprising computer readable instructions to enable the system to accept input of known celestial bodies of known angular distance from the celestial database, for the purposes of determining and storing calibration parameters, and enabled to determine an angular distance above the earth's horizon of a celestial body or celestial object, wherein said angular distance of the celestial body or celestial object above the earth's horizon is a sextant altitude, and output that determination for purposes of navigation.

The system for measuring angular distance and determining a sextant altitude for a celestial body or celestial object may further comprise computer readable instructions enabling the computational element to: a) calculate an observed altitude from said sextant altitude; b) determine a sight reduction from said observed altitude; c) determine lines of positions from two or more sight reductions and reference to the celestial database; d) determine a geographical position of the imaging device or fix, from the intersection of a plurality of lines of positions; and e) output any one or more of the determinations made by the system.

A method for using the system for measuring the angular distance between two objects, the method comprising: calibrating the system by: a) inputting parameters of the imaging device and image detector, b) inputting the known angular distance for pixels selected to represent the two objects of known angular distance and storing these inputs as calibration parameters; and, determining an unknown angular distance by; c) inputting pixels selected to represent the two objects of unknown angular distance, d) applying the calibration parameters to the objects of the unknown angular distance, and allowing the computational element to determine the unknown angular distance of the unknown objects, and e) outputting the angular distance determination.

A method of navigation using the system for measuring sextant altitudes of a celestial body or celestial object, in communication with a celestial database, the method comprising: a) inputting parameters of the imaging device and image detector; b) inputting the known angular distance representing the two objects of known angular distance, or preferable, the known angular distance of celestial bodies from the celestial database, for storage as calibration parameters; c) inputting pixels selected to represent a celestial body or celestial object and earth's horizon of unknown sextant altitude; d) applying the calibration parameters to the unknown sextant altitude of the celestial body or celestial object, and allowing the computational element to determine the unknown sextant altitude of the celestial body or celestial object, and e) output the determination of the sextant altitude.

A method of navigation using the system for measuring sextant altitudes of a celestial body or a celestial object, in communication with a celestial database and enabled to determine a geographical position, or fix, the method comprising: a) the method of determining a sextant altitude applied to determine two or more sextant altitudes for two or more celestial bodies or celestial objects; b) calculating observed altitudes from said sextant altitudes; c) determining sight reductions from said observed altitudes; d) determining lines of positions from the two or more sight reductions and reference to the celestial database; e) determining a geographical position of the imaging device, or fix, from the intersection of the two or more lines of positions; and f) outputting any one or more of the determinations made by the system.

BRIEF DESCRIPTION OF THE DRAWINGS

FIG. 4 illustrates an enlargement of FIG. 3 showing a detailed black and white negative calibration image of the Cassiopeia constellation and nearby stars (upper panel) and the corresponding star chart (lower panel).

FIG. 5 illustrates a data output listing representing the imaging device calibration parameters. Listed are pixel locations of stars in the image used for calibration in the example of FIGS. 2-4.

FIG. 21 illustrates DIS Reduction UI Showing Pixel Imports from AstroImageJ derived from the images in FIG. 20.

DETAILED DESCRIPTION OF THE INVENTION

Figure 1:
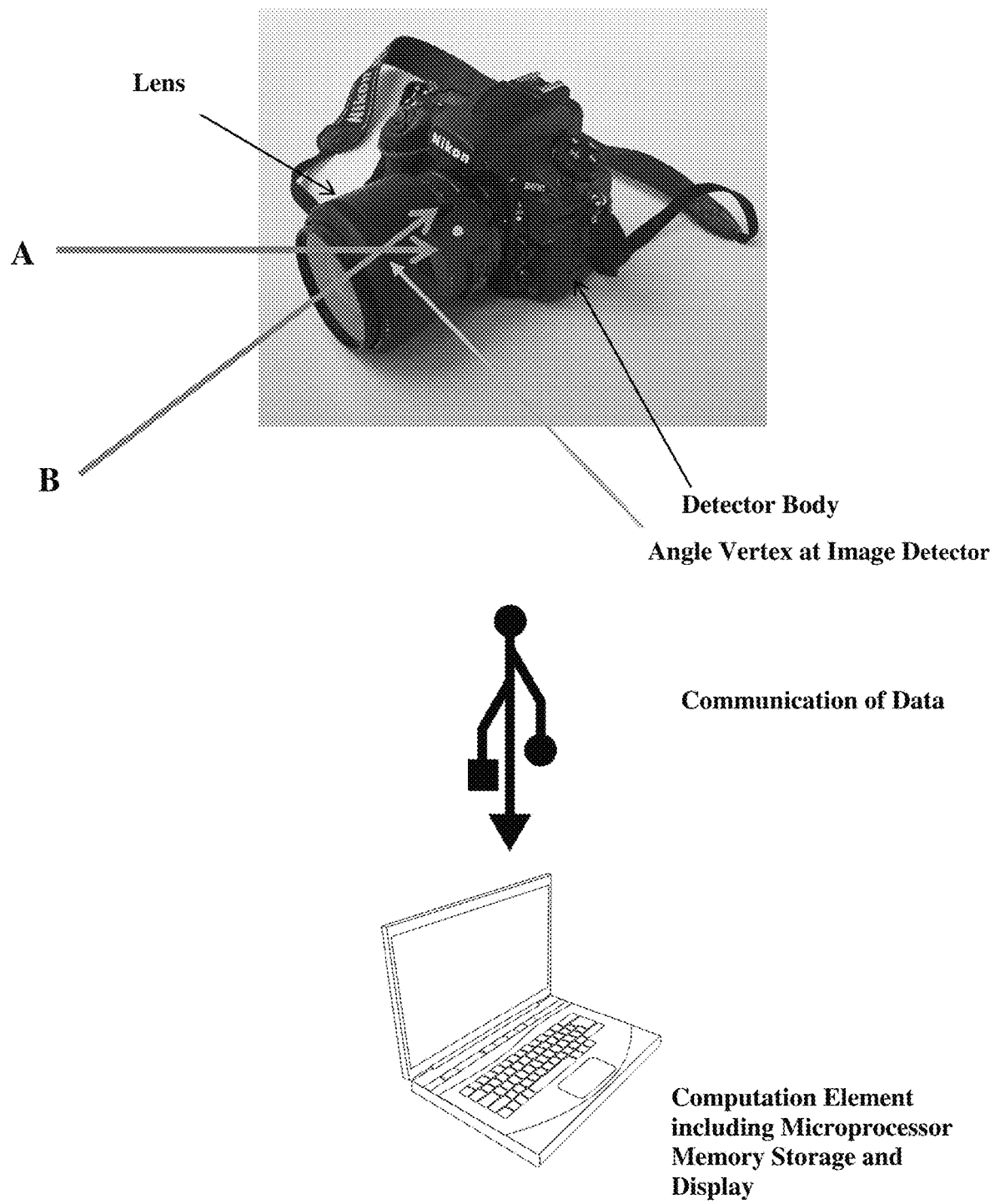
FIG. 1 illustrates is an exemplary digital system for measuring angular distances. Shown is a perspective view of an imaging device, by way of example a digital camera, and computational element, by way of example a personal computer, and means of communication between the imaging device and computational element, by way of example a USB connection. Also illustrated is the angle which is measured by the computational element, as defined by two lines or rays projected from objects A and B, representing incident light from each object of which angular distance is to be determined. The vertex of the angle is a function of the lens and the distance between where the object images strike the image detector.

The present invention, referred to herein as the system, or digital system for measuring angular distances, or Digital Image Sextant (DIS), includes an imaging device, and a computational element capable of determining an angle as defined by two lines or rays, directed from two objects or points, or two points on the same object, to the imaging device, whereby the angle to be measured is formed by the intersection of the lines or rays at a point in the image device, (See FIG. 1). This angle is referred to herein as the vertex, angle, or angular distance between the two objects. This angle is also referred to herein as a sextant altitude, in reference to celestial navigation when it is used to represent the angular distance between the earth's horizon and a celestial body.

The imaging device includes an image detector and preferably a lens, to capture an image digitally, and typically also includes digital storage media and a means to store digital images. It may also be enabled to record the date and time that the digital image was captured. By way of example, a typical imaging device may be a digital camera. It is not necessary that the means to store digital images be incorporated into the imaging device. A suitable imaging device must be enabled to capture images of sufficient resolution and sensitivity to determine angles with sufficient accuracy, and enough dynamic range to accommodate the level of available light for the measured elements under normal environmental conditions. The imaging device must also support a field of view wide enough to capture the objects or points to be measured. The Inventor reasoned that by taking advantage of increases in resolution, sensitivity and dynamic range of digital imaging devices, it may be possible to construct a superior and practical alternative to mechanical optical sextants and quadrants in use for centuries, for celestial navigation.

The computational element, which may be comprised of computational hardware and/or software, may or may not be physicality associated with the imaging device. The computational hardware is typically a microprocessor in communication with digital storage media, including non-transitory digital storage media and software, a keyboard, and a display, by way of example, a personal computer. The software comprises computer readable instructions which enable the computational element not only to accept calibration parameters and determine angular distances between objects recorded by the imaging device, but also to correct for imperfections in the system and/or the digital imaging device, in order to achieve the precision necessary to use the system for navigation. The software may allow the user to enter data, as necessary, or select output data, as desired, through the uses of one or more user interfaces including a keyboard and/or graphic interface, such as a dialog box. In at least one embodiment, the computational element, is further enabled to determine geolocations based on angular distance of celestial bodies above the earth's horizon in reference to a celestially database, and to display these geolocations and related navigational information. The computation element may utilize any means of display, by way of example, any form of computer monitor including LED or LCD screens, any form of plotter, navigational chart plotter, printer, or any form of mechanical display and the like.

Prior to using the system to measure angular distances, the system may be calibrated using images of known angular distance, to establish a predictable relationship between the coordinates of any two pixels of a captured digital image and the angular distance between them. Calibration will also adjust for imperfections and non-liner relationships between pixels that are inherent of the system. Calibration ensures the accuracy necessary for measuring precise angular distances which is particular important in celestial navigation.

In at least one embodiment, is a system, including an imaging device, enabled to capture and store digital images, and a computational element enabled to accurately measure and display the angular distance between any objects on the digital images, including the angular distance between the earth's horizon and a celestial body, also referred to as a sextant altitude. The system is enabled to be calibrated using images of known angular distance to improve accuracy and reduce errors inherent in the system. An angular distance determined with the system may be used in any application, including, by way of non-limiting examples, land surveying and celestial navigation. A angular distance, between a celestial body and the earth's horizon may be referred to as a sextant altitude. A sextant altitude, once determined by the system, may be used directly with any conventional or traditional system, or may be used in automated systems, for the purposes of navigation.

In at least one embodiment, the system is manufactured to be used with a known imaging device, whereby calibration parameters are known and preprogrammed into the system. By way of example, a digital sextant may be manufactured with a given imaging device, in which the lens focal length, size and number of pixels of the image detector, and image correction algorithms are known. In this embodiment, the calibration parameters may be preprogrammed into the computational element, eliminating the calibration step for the user.

In yet another embodiment, the system is manufactured with interchangeable elements. By way of example, the image detector may be manufactured to accept interchangeable lens to more accurately detect a particular range of angles. Different lens may better enable the system to more accurately measure angular distances of low horizon, mid horizon, or zenith celestial bodies. The computational element, may be enabled to detect a particular lens or interchangeable element, and automatically adopt a preprogrammed set of applicability calibration parameters.

In at least one embodiment, the computational element of the system is in further communication with a celestial database, by way of example, a solar system ephemeris or database of celestial objects and/or a database of celestial bodies and their celestial coordinates. The computational element is enabled to identify a celestial body or object, recorded on a digital image. The computational element may use a celestial object or celestial body's celestial coordinates (Right Ascension and Declination) and time of observation to calculate the celestial objects or body's geolocation coordinates (latitude and longitude) and thereby identify a point on the earth, where the body is directly overhead at the time of observation. In celestial navigation, the observed altitude of the body establishes the radial distance of the observer from the geolocation of the observed body. The lower the observed altitude the greater the radial distance. E.g. if the observed altitude is 90 degrees, the radial distance is zero and the observer is at the geolocation of the object. At zero degrees observed altitude, the observer is ¼ of the way around the world from the geolocation of the object. The circle of position that the observer must be on is the set of all points on earth at the same radial distance from the observed body's geolocation. The exemplary embodiments disclosed herein utilizes the Yale Bright Star Catalog (Hoffleit et al., (1991) "The Bright star catalogue." New Haven, Conn.: Yale University Observatory, c1991, 5th rev. ed., edited by Hoffleit, Dorrit; Jaschek, Carlos), as one non-limiting example. Other non-limiting examples of star catalogs include FK5 (Fricke, et al. "Fifth fundamental catalogue (FK5). Part 1: The basic fundamental stars." Veroeffentlichungen des Astronomischen Rechen-Instituts Heidelberg 32 (1988): 1-106), Hipparcos (Perryman, et al. (1997) "The HIPPARCOS catalogue." Astronomy and Astrophysics 323), and the like. In at least one embodiment, the computational element of the system is in further communication with a solar system ephemeris to calculate the apparent celestial coordinates of solar system bodies (planets, moons, sun, comets). The motion of celestial bodies relative to earth means that their apparent Right Ascension and Declination changes much more quickly than stars and must be calculated ephemerally. In the examples that follow, Astrolib is utilized as one non-limiting example of an ephemeris. Other such ephemeris include: JPL Solar System Dynamics, Swiss Ephemeris, Ephemeris Java, and the like. In at least one embodiment, the computational element is further enabled to identify celestial bodies or celestial objects of digital images as well as provide geolocations of the imaging device based on sextant altitudes of the celestial bodies. A sextant altitude, often referred to simply as an altitude in nautical navigation terms of art and as used herein, may be defined by the angular distance between a celestial body and the earth's horizon. In at least one embodiment, the computational element is further enabled to derive a fix, based on sextant altitudes of celestial bodies recorded by the imaging device. By way of example, the computational element may determine the angular distance or sextant altitude of one or more celestial bodies from the earth's horizon, from one or more digital images. The computational element may then: apply calibration parameters to determine more precise sextant altitudes; derive observed altitudes from sextant altitudes by correcting for environmental conditions; derive sight reductions from observed altitudes for each of the celestial bodies, derive Lines of Position from each sight reduction and display each Line of Position on a map or nautical chart showing possible positions of the observer or imaging device. And/or, the computational element may display or plot the intersection of two or more Lines of Position thereby determining the position or a fix of the observer or imaging device.

In the various embodiments, parameters or data may be entered or selected by the user. By way of example, the user may manually select a pixel representative of an object or point to be measured by the computational element using digital image processing software, by way of example, ImageJ1. It is expected that any digital image processing software may be utilized which is enabled to display an image of the same resolution as recorded by the image detector and allow the user to select individual pixels. Selection of a representative pixel is especially useful where objects are large and of unusual shape, as may be the case for use in celestial navigation. The computational element is then enabled to use the selected representative pixels to determine an angular distance. The user may also manually enter any one or more other parameters including: time, height of eye, pressure, temperature, heading or speed.

In yet other various embodiments, the computational element may be enabled to autonomously select a pixel representative of an object, the horizon, or point to be measured using digital imaging processing software, including but not limited to ImageJ. (see Ettinger, Scott M., et al. (2002) "Towards flight autonomy: Vision-based horizon detection for micro air vehicles." Florida Conference on Recent Advances in Robotics. Vol. 2002), incorporated herein by reference). The computational element is then enabled to use the selected representative pixels to determine an angular distance. In this exemplary embodiment, the imaging device captures the image as well as the date and time of the observation to be used in calculating the fix. In various other embodiments, it is envisioned that commercially available sensors may be used to capture any one or more of the environmental conditions used in celestial navigation including: height of eye, atmospheric pressure, temperature, speed and heading. In yet another embodiment, automated capture of the azimuth angle of the image may assist in an automated identification of the observed celestial body.

Figure 15:
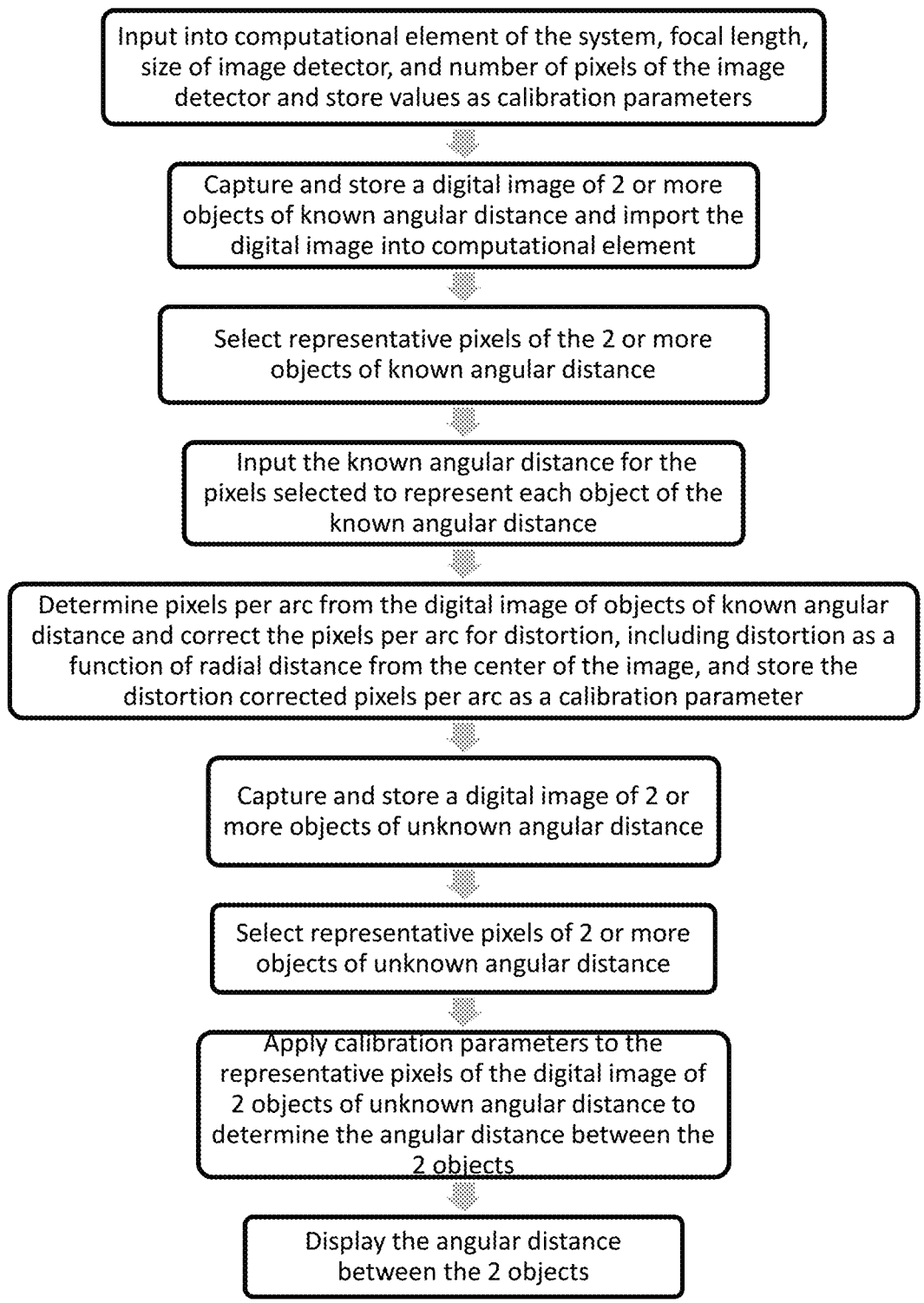
FIG. 15. Flow Chart 1, illustrates a method of calibrating and using the digital system for measuring angular distances.

In yet another embodiment is a method of calibrating and using the digital system for measuring angular distances as illustrated in Flow Chart 1, (see FIG. 15).

Figure 16:
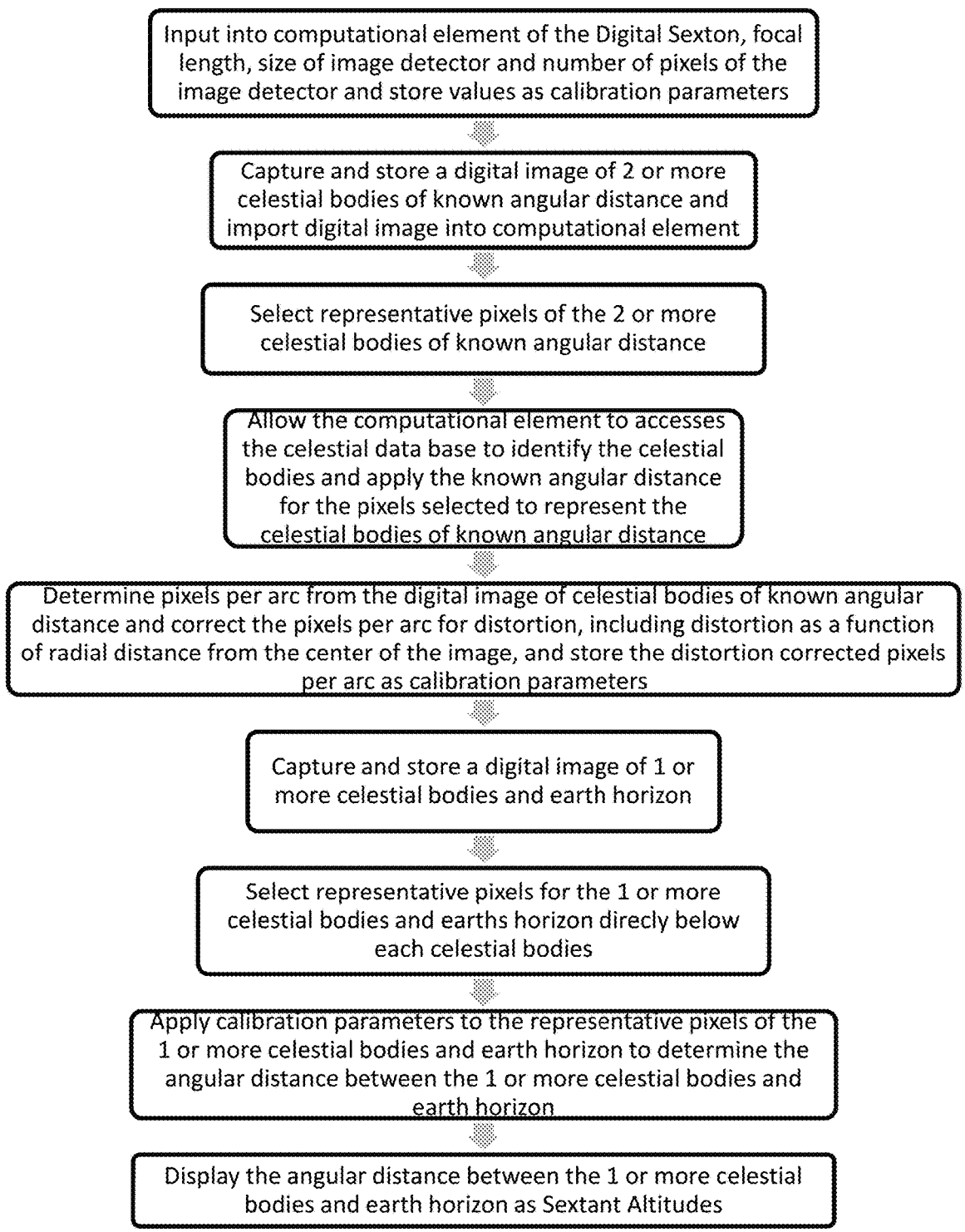
FIG. 16. Flow Chart 2, illustrates a method of calibrating and using the Digital Image Sextant for determining sextant altitudes of celestial bodies.

In yet another embodiment is a method of calibrating and using the Digital Image Sextant for determining sextant altitudes of celestial bodies as illustrated in Flow Chart 2 (see FIG. 16).

Figure 17:
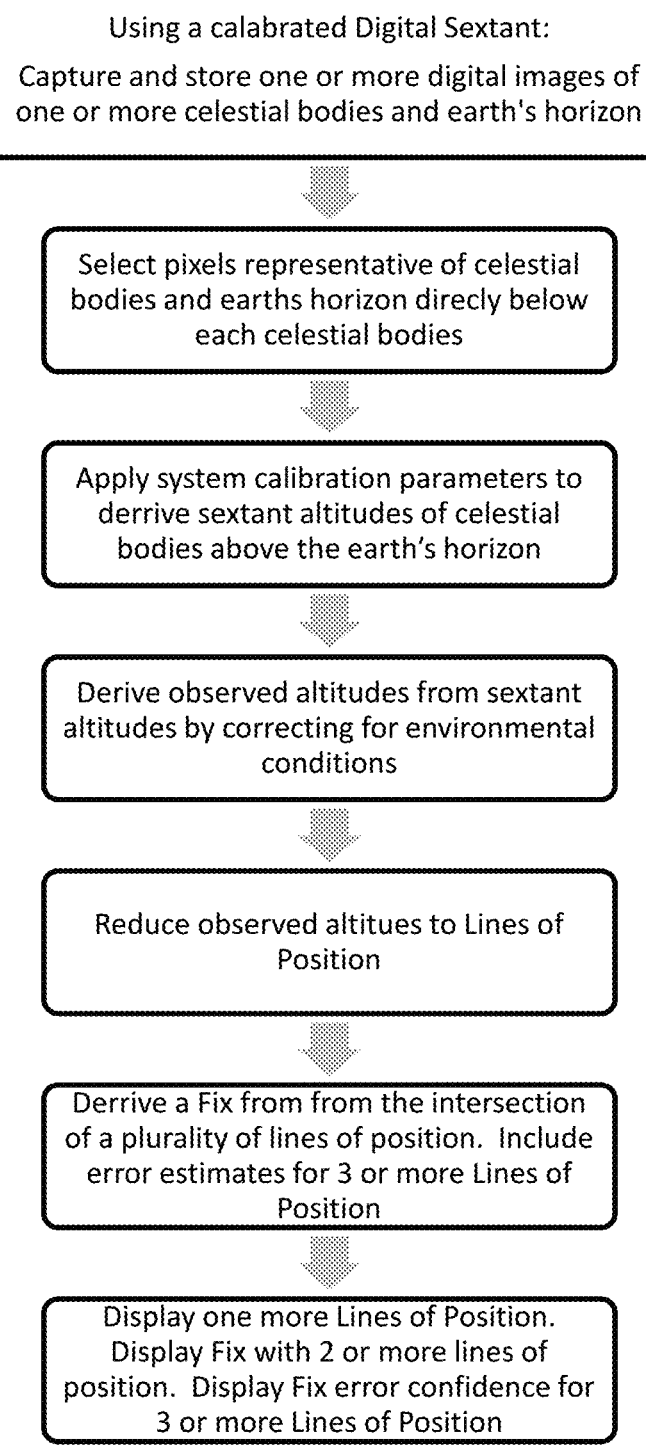
FIG. 17. Flow Chart 3, illustrates a method of using a calibrated Digital Sextant for determining a position fix.

In yet another embodiment is a method of using a calibrated Digital Sextant for determining a position fix, as illustrated in Flow Chart 3 (see FIG. 17).

Definitions

The term "Digital Image Sextant" or "DIS" as used herein, refers to the system for measuring angular distances applied for celestial navigation.

The term "angular distance" as used herein, refers to the size of the angle between two lines or rays originating from two objects or two points and terminating at the observer or imaging device. When used in celestial navigation the angular distance may be referred to as a sextant altitude.

The term "Height of eye" as used herein, refers to the height above sea level of an observation or digital image recorded for celestial navigation.

The term "celestial database" as used herein, refers to any data base of the coordinates of naturally occurring astronomical bodies or objects or artificial satellites in the sky, including an ephemeris or a star catalog.

The term "Right Ascension and Declination" as used herein, refers to celestial coordinates used in star catalogs and ephemeris to identify celestial bodies or objects in the sky. Right Ascension is measured continuously in a full circle from the vernal equinox towards the east. It is an angular distance, customarily expressed in hours (h), minutes (m), and seconds (s). Declination refers to an angular distance measured north or south of the celestial equator, wherein a location at the celestial equator has a declination of 0°, the north celestial pole has a declination of +90°, and the south celestial pole has a declination of −90°.

The term "star catalog" as used herein, refers to a data base of the coordinates of naturally occurring celestial bodies in the sky at a given time or times.

The term "ephemeris" as used herein is meant to refer to a data base of the coordinates of naturally occurring astronomical objects as well as artificial satellites in the sky at a given time or times.

In contrast to a star catalog, an ephemeris contains bodies with astronomical coordinates that change rapidly from the viewpoint of an observer on the earth. The apparent astronomical coordinates of a solar system body, by way of example, a relatively close planet, moon, or sun, which changes rapidly may be cataloged in an ephemeris. Whereas apparent star coordinates that change slowly may be use without correction for time periods as long as several years.

The term "Sextant Altitude" as used herein, refers to the angular distance of a celestial body or celestial object above the earth horizon as measured by the sextant before correcting for the conditions of the observation.

The term "sight" or as used herein, refers to process of determining a sextant altitude of a celestial body or celestial object.

The term "sight reduction" or as used herein, refers to process of deriving a line of position or circle of position from an observed altitude or sextant altitude in reference to a star catalog or ephemeris.

The term "Observed Altitude" as used herein, refers to a Sextant Altitude corrected for customary conditions of observation such as: "height of eye", parallax and refraction which is a function of true altitude, temperature, pressure.

The terms "Circle of position" and "Circle of altitude" as used herein, refers to a circular line of possible geolocations of the image detector (the "observer") as derived from a sight reduction in reference to a star catalog or ephemeris.

The term "Line of position" as used herein, refers to a partial circle of position representing possible locations of the image detector or observer as derived from a sight reduction in reference to a star catalog or ephemeris. The line of position is customarily a straight segment approximation of the Circle of position near the expected fix location. In this exemplary embodiment, the segment is curved to better match the segment of the circle of position.

The term "Fix" as used herein, refers to a location of the image detector or observer as derived from the intersection of 2 or more lines of position or circle of positions.

The term "d.r. Track" or "Dead Reckoning Track" as used herein, refers to the calculation of one's current position by using a previously determined position, or fix, and advancing that position based upon known or estimated speeds and course over elapsed time.

The term "Ellipse of 95% confidence of location" as used herein, refers to a confidence level which may be graphically represented, of an area in which the image detector or the observer is located within in a 95 percent confidence level.

The following are of exemplary embodiments to illustrate the principles of the invention. These exemplary embodiments are provided to illustrate aspects of the invention, but the invention is not limited to any embodiment. The scope of the invention encompasses numerous alternatives, modifications and equivalent; it is limited only by the claims. Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured. The detailed description of the embodiment that follows, including the Figures, demonstrates the use of the invention in measuring digital images to determine angular distances. It also demonstrates the use of an embodiment that measures angular distances with sufficient accuracy to be utilized as a sextant in the practice of celestial navigation.

Example 1

Jupiter Fla., South of Jupiter Inlet
I Digital Image Sextant (DIS)

Referring to FIG. 1, illustrated in this exemplary embodiment is a system for measuring angular distances. The system comprises an imaging device which includes a lens, a digital image detector, a means of storage of captured digital images, a computational element, with digital memory storage, including non-transitory computer memory, a means to input data, and a display. The computational element further comprises computer software, or computer readable institutions to enable the system as disclosed herein. A means to communicate digital information, including images, between the image detector to the computations element is indicated. The exemplary embodiment in FIG. 1 is a system comprised of digital camera in communication with a personal computer containing software, via a USB portal. The computational element or computational hardware and software including computer readable instructions enable it to determine angular distances may be incorporated into, physical attached to, physical separate, or in electrical communication with the imaging device of FIG. 1. The computational element is enabled to analyze a digital image once the digital image is transferred to the computational element through any convenient means, by way of example, through electrical communication including USB, Bluetooth, email, or the physical transfer of digital storage medium. The term angular distance as used herein is meant to describe the distance between two objects expressed as the angle at the vertex of any two rays, as illustrated in FIG. 1, rays A and B, represent an angle of incident of light coming from two objects or points to be measured, with the vertex of the angle located at digital image detector. The computational element is enabled to determine angular distances of the digital image using stored calibration parameters of angular distances of known angles, including any and all variation in pixels per arc as a function of pixel location in the image frame, or the image detector, and to correct for any and all system errors. It is expected that once the calibration parameters are entered into a computational element for a particular imaging device, the system will be calibrated for use with any imaging device that shares these calibration parameters.

In at least one embodiment, referred to herein as a Digital Image Sextant (DIS), the system further comprises a celestial database, by way of non-limiting example, the Yale Bright Star Catalog (Hoffleit, Dorrit, and Carlos Jaschek. "The Bright star catalogue." New Haven, Conn.: Yale University Observatory, c1991, 5th rev. ed., edited by Hoffleit, Dorrit; Jaschek, Carlos (1991), incorporated herein by reference in its entirety. The computational element is further enabled to provide geocoordinates of the imaging device, based on measurements of angular distances, or sextant angles of one or more celestial bodies from earth's horizon, from one or more digital images, and referencing the sextant altitudes to the celestial database.

In this exemplary embodiment, the lens and image detector were selected to give a sufficient field of view, resolution and sensitivity for measuring celestial altitudes. The field of view will capture the celestial body and earth's horizon. A 90-degree field of view or greater would enable the device to measure from earth's horizon to zenith. Resolution, determined by the number of pixels per degree of arc, directly affects the ultimate accuracy of the measurement. Sensitivity must be sufficient to allow the detection of celestial objects and the horizon in the same image.

I Calibration and Storage of Calibration Parameters

Prior to using the system to determining angular distances, calibration is performed and calibration parameters stored in the computational element. Calibration is performed to establish a predictable relationship between the coordinates of any two pixels and the angular distance between any two pixels, in a digital image. (also see FIG. 15, Flow Chart 1 and FIG. 15, Flow Chart 2) The imaging device in this embodiment is rectilinear. The term "rectilinear" as used herein, is meant to mean that the image is distorted to keep constant angles across the image. By way of example, straight lines appear straight in the image, similar to how a line of constant bearing appears straight on a Mercator projection map. By way of explanation, another embodiment may utilize a wide-angle or "fisheye" lens (35 mm or less) which may require less correction to maintain constant angular distances across the image.

Figure 2:
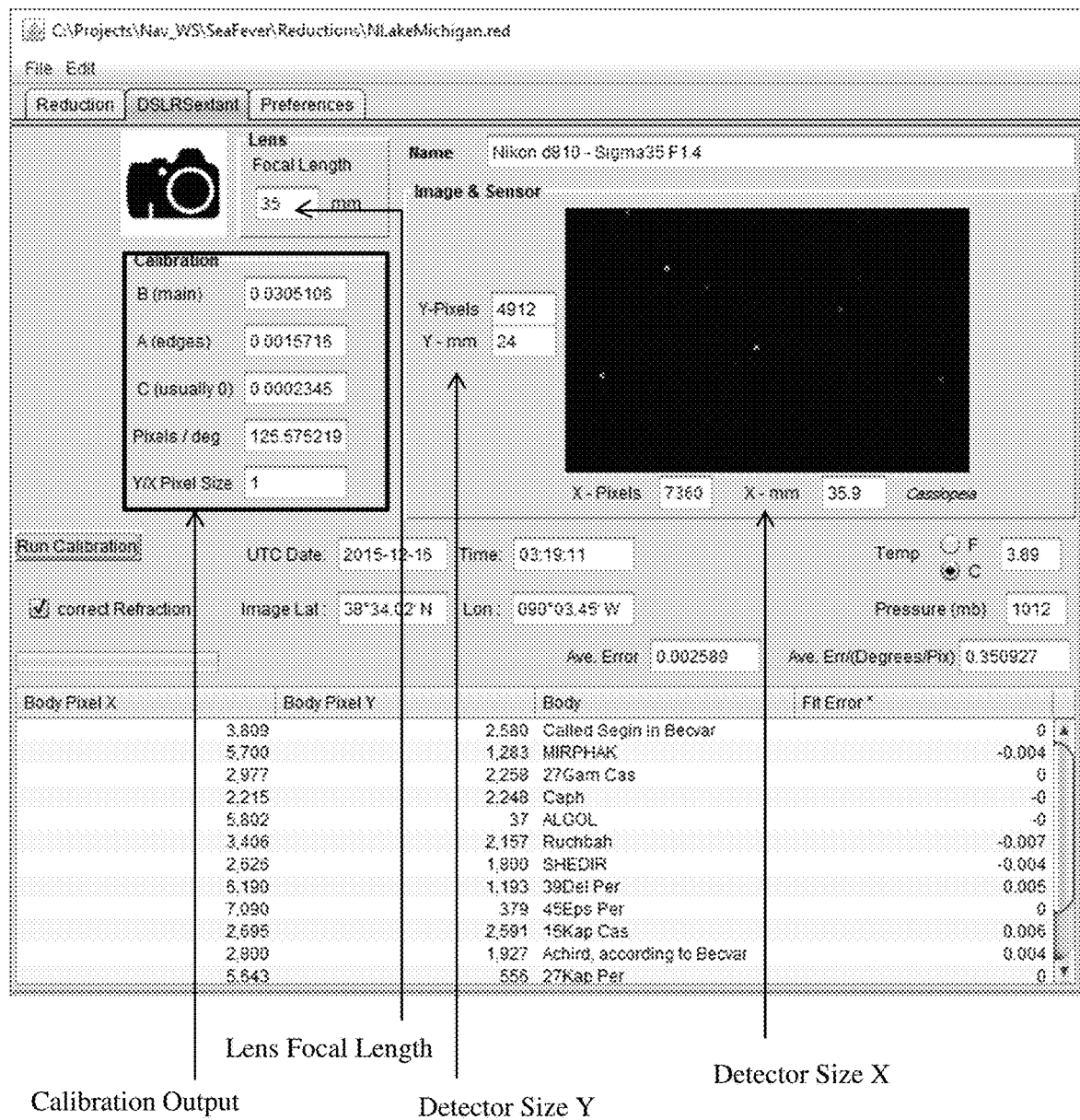
FIG. 2 illustrates a user interface for calibration of the system in the form of a dialog box as it would appear on the display of the computational element of FIG. 1.

FIG. 2, illustrates a calibration interface. The user enters the Lens Focal Length in millimeters and the Detector Size as X and Y in millimeters, as well as the number of pixels in the X and Y directions of the detector. The interface also displays the calibration parameters. A lens with a 35-mm focal length was used with a detector with dimensions of 35.9×24 mm. The field of view is 54.3 Degrees as calculated by. The detector had 7360×4912 pixels yielding 0.44 minutes of arc resolution or approximately half the resolution of a traditional modern professional sextant. The sensitivity is up to ISO 12,800, which aids in detection in low light conditions. In a celestial navigation, embodiments with high sensitivity are better enabled with horizon detection.

In the example of FIG. 2, the specifications entered by the user are:
  a) Lens: Focal Length=35 mm.
  b) Detector: X and Y Size (mm) X=35.9 and Y=24
  c) M and N (number of Pixels in the X and Y directions) M=7360 and N=4912.

The computational element uses the focal length and detector X & Y size to calculate the field of view of the imaging device.

Field of View =
$$2*\text{atan}\left(\frac{sizeX}{2*\text{Focal Length}}\right) = 2*\text{atan}\left(\frac{35.9 \text{ mm}}{2*35 \text{ mm}}\right) = 54.3 \text{ degrees}$$

The initial, pre-calibration value for pixels per degree is M/Field of View. In this exemplary embodiment:
  Pre-calibration value=7360 pixels/54.3 degrees=135.5433 pixels/degree.
  The values for M & N are also applied in the calibration which corrects for distortion as demonstrated in section III.

Figure 3:
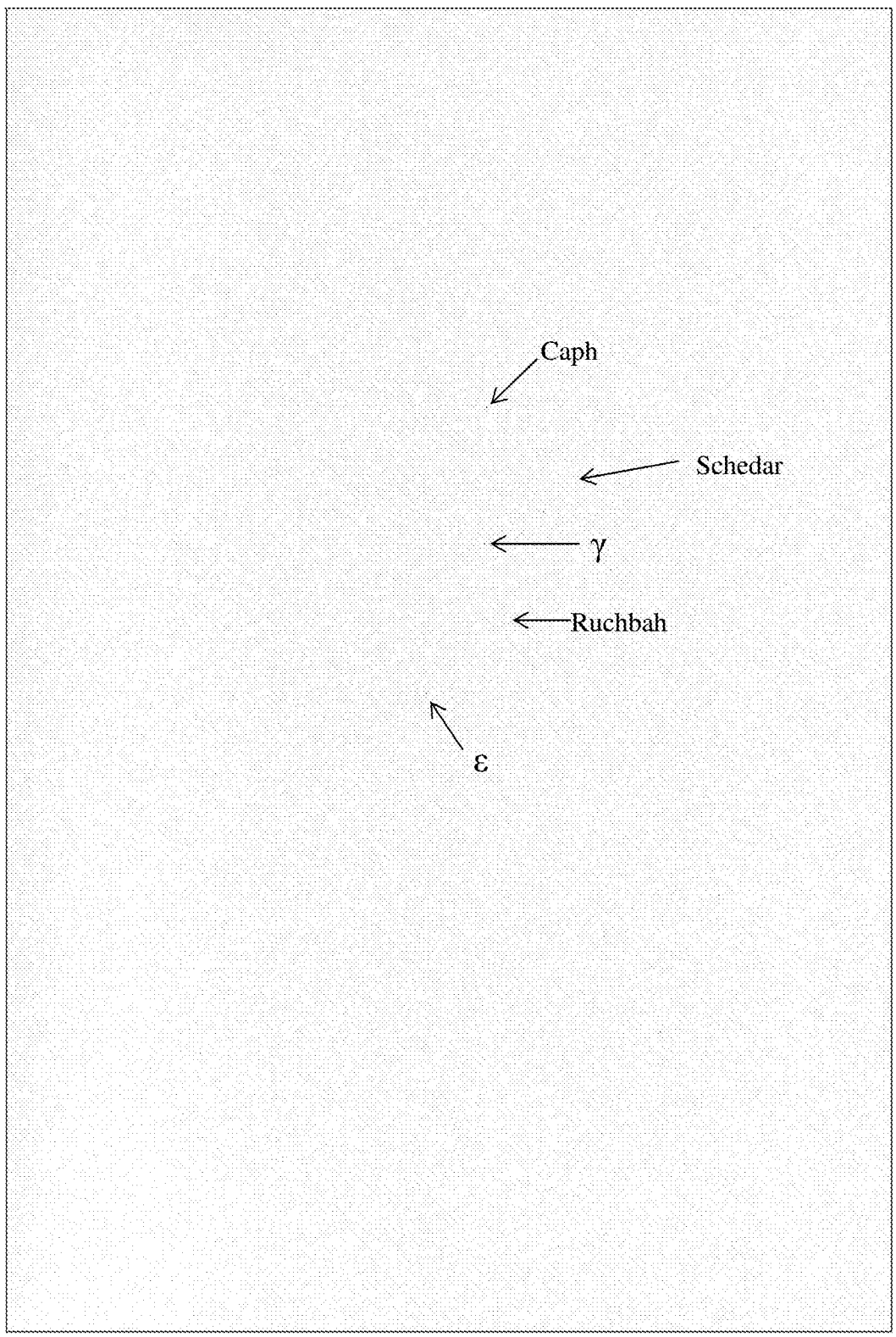
FIG. 3 illustrates a black and white negative calibration image of the Cassiopeia constellation and nearby stars.
Figure 6:
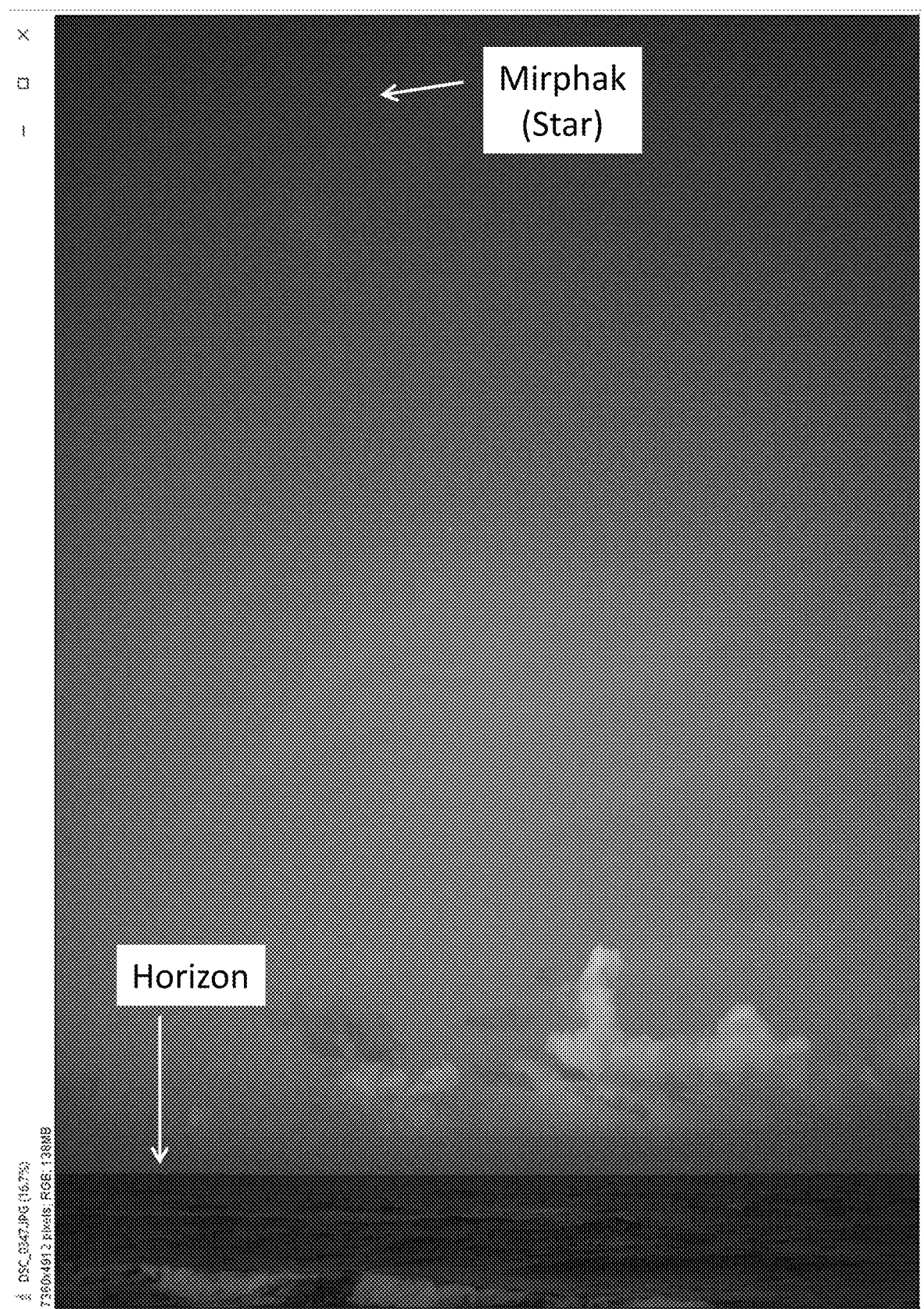
FIG. 6 is an image which includes an earth horizon and the star Mirphak, as used in the exemplary embodiment.

In reference to FIGS. 3 and 4, the device is being used to capture an image containing reference points of known angular distance. In this example, an image of the constellation Cassiopeia and nearby stars was captured. The user will select pixels to be associated with known celestial bodies or objects (stars) as described below (see section VI). Since, the celestial coordinates of each star are known and assessable from the celestial database and are cataloged in angular dimensions (right ascension and declination), the computational element can calculate an angular distance between any selected stars using spherical trigonometry. Specifically, the exemplary embodiment uses the Vincenty formula (Vincenty Thaddeus (1975-04-01). "Direct and Inverse Solutions of Geodesics on the Ellipsoid with Application of Nested Equations" (PDF). Survey Review. Kingston Road, Tolworth, Surrey: Directorate of Overseas Surveys. 23 (176): 88-93. doi:10.1179/sre.1975.23.176.88. Retrieved 2008-07-21.).

The Vincenty formula (Id.)

$$\Delta\sigma = \arctan\frac{\sqrt{(\cos\phi_2 * \sin(\Delta\lambda))^2 + (\cos\phi_1 * \sin\phi_2 - \sin\phi_1 * \cos\phi_2 * \cos(\Delta\lambda))^2}}{\sin\phi_1 * \sin\phi_2 + \cos\phi_1 * \cos\phi_2 * \cos(\Delta\lambda)}$$

Where:
  $\Delta\sigma$ is the angular distance between two coordinates in degrees arc
  $\phi_1 \& \phi_2$ are the declination of coordinates 1 & 2 respectively in degrees
  $\Delta\lambda$ is absolute difference in Right Ascension in degrees arc Once the user assigns a representative pixel to each selected star of the calibration image, the true or uncorrected angular distance between selected stars may be calculated by the computational element and assigned to the representative pixels. The following provide specific detail for the calibration of the DIS using known angular distances between stars or their assigned pixels.

As noted, stars were used for calibration because for many years the angular distance between them remains constant within limits of navigational precision. The computational element does correct stars celestial coordinates to adjust for "proper motion"[2] by date but the correction is generally not significant for the duration between publications of the Yale Bright Star Catalog. Selected stars including "Ruchbah" are labeled in FIGS. 3 and 4. Images are used to calibrate the DIS as follows:
  a. Preferred calibrations result from utilizing reference points dispersed across the available image area in both the x and y direction. In this example, known stars near the edges and center were selected.
  b. If an image of celestial bodies is used, it is preferable that they are near their zenith to minimize effects of atmospheric refraction. An improved calibration can be obtained by correcting for refraction based on the zenith distance of the celestial objects as demonstrated in this embodiment. In the exemplary embodiment, the geolocation and time of the image capture, the temperature and atmospheric pressure were also recorded. The time and geolocation were used to calculate the zenith distance of each star in the image. Zenith distance is a term of art for the angular distance of a celestial body or object, (in this example, a star), from the observer's local zenith. The observer's local zenith is a point in the sky that is directly overhead or at an altitude of 90 degrees. The zenith distance, temperature, and pressure, are used to correct the apparent celestial coordinates of the celestial bodies or star for atmospheric refraction. This is done using the refractive correction method of Bennett (Bennett et al., (1982) The Journal of Navigation 35.2: 255-2597).

Refractive Correction (Id.):

$$\text{Refraction} = \cot\left(h_a + \frac{7.31}{h_a + 4.4}\right) * \left(\left(\frac{p_{mbar}}{1010}\right) * \left(\frac{283}{t_c + 273}\right)\right)$$

Where:

$h_a$=Apparent Altitude. (90−Zenith Distance is substituted)

$p_{mbar}$=Atmospheric pressure in millibars $t_c$=Temperature in degrees Celsius c. In reference to FIG. 5, pixel locations (x, y) from the image are associated with stars in the catalog. The catalog used in this software embodiment is the Yale Bright Star Catalog.

d. The user assigns a representative pixel for each star in the calibration image to be used to create calibration parameters. For stars, it is typically the brightest pixel. If there are more than one pixel at the brightest value, the center most pixel of the brightest set is selected.

e. The software calculates the angular distance values between selected celestial bodies-based on the celestial coordinates of each celestial body, which are cataloged in the celestial data base as angular measurements (Right Ascension and Declination).

f. The calculated angular distance between the selected stars, is assigned to the representative pixels to provide a known angular distance between the representative pixels. Once known angular distances between the representative pixels are assigned, they may be used to establish the parameters of the distortion correction formula described in section III.

III Distortion Correction

Referring again to FIG. 2, the following calibration parameters for the exemplary Digital Image Sextant (DIS) have been calculated by the computational element, and displayed as follows:

a. Pixels/deg: Pixels per degree of arc across the image=125.5752559 b. y/x Ratio: Corrects for rectangular vs. square pixels (different pixels/deg in y vs x)=1.0.

c. A, B, C & D: Coefficients of the distortion correction formula to produce constant pixels per degree across the image: A=0.001597, B=0.0304598, C=0.0002505 D=(1−A−B−C)=0.9676927

The calibration parameters including coefficients for the distortion correction formula and the pixels/deg and yxRatio are empirically determined by the computational element. The software adjusts the calibration parameters of the distortion correction formula (A, B, C, D), the pixels/deg and the yx Ratio, until minimum discrepancy exists between true angular distance determined from celestial coordinates and the angular distance value measured by the DIS. Distortion correction calibration is performed as follows:

a) The software performs a permutation of values A, B, C & pixels/degree. D is a dependent value of A, B & C and is not varied separately.

b) The angular distance between each pixel coordinates (x,y), representing known stars distributed throughout the image field, including a pixel representing a known star selected for being closest to the center of the image, is calculated using the Distortion Correction Formula and Angular Distance Formula, below.

c) The calculated pixel angular distances are subtracted from the known angular distances calculated using the stars celestial coordinates (Right Ascension & Declination). The difference is displayed as the "Fit Error" in FIG. 5, in units of degrees.

d) The absolute value of Fit Errors are summed and displayed as the "Sum of Errors" in FIG. 5.

e) Steps b-d of this section are repeated until a permutation of values for A, B, C & Pixels/Degree have been tried. The set of values that yield the minimum sum of errors is stored as the calibration parameters for the detector and lens combination.

f) For the exemplary image capture device described above the maximum range of variation of parameter A & B was 1.0. Parameter C was 1/500 and pixels/degree was 10% of the nominal value=M/Field of View. Where M is the number of pixels across the field of view in degrees.

g) Yx Ratio was 1.0 in exemplary image capture device.

In reference to FIG. 2, the calibration parameters are then stored in non-transitory system memory. The distortion correction formula is shown below.

Distortion Correction Formula:

For a pixel at position x, y, calculate a new position x', y':

$$\text{radius} = \text{Min}\{M, N\}/2$$

$$dx = (x - X center)$$

$$dy = (y - Y center)$$

$$\text{radial distance} = r = \frac{\sqrt{dx^2 + dy^2}}{\text{radius}}$$

correction factor =

$$cf = \left|\frac{1}{Ar^3 + Br^2 + Cr + D}\right| \quad x' = X center + (dx * cf * \text{radius})$$

$$y' = Y center + (dy * cf * \text{radius})$$

Where:

M & N are the number of X & Y pixels in the detector

A, B, C are empirically determined by the calibration and D=1−A−B−C

The measurement of Angular Distance using distortion corrected pixels x', y' is performed according to the Angular distance formula.

Angular Distance Formula:

For two pixels xy1 and xy2 apply Distortion Correction Formula to each to yield xy1' and xy2':

$$dx' = x1' - x2'$$

$$dy' = (y1' - y2') * yxRatio$$

$$\text{Angular distance (degrees)} = \frac{\sqrt{dx'^2 + dy'^2}}{\text{pixels/deg}}$$

Where the empirically calibrated values are:

yxRatio corrects for rectangular vs. square pixels pixels/deg is the calibrated pixels per degree of arc.

Illustrated in FIG. 5, is a data output representing the calibration parameters. It lists the pixel location of stars in the image used for calibration in the example shown in FIGS. 2-4. It also lists stars and their known celestial coordinates to be associated with their respective pixel locations and includes a Fit error, to calibrate the system. The angular distance formula, using pixels' positions corrected for distortion, may be used for determining extremely accurate angular distances of objects or points on a digital image. In the exemplary embodiment, calibration was performed using an image of stars as a convenient set of points of known angular distance, able to span the image frame. However, the image capture device may be calibrated by capturing an image of any set of points of known angular distance from the perspective of the device and user and applying the same or similar methodology.

Once calibrated the system may be used to determine angular distances for any purpose. The exemplary embodiment is directed for celestial navigation, where the angular distance between celestial objects and the earth horizon, also referred to as a sextant altitude, may be used to determine a geographical location of the user or the image device. As with a traditional sextant, a sextant altitude once determined, may be use in concert with any conventional or traditional method of deriving the various navigational coordinates and determinations.

The computational element in this exemplary embodiment is further enable to derive and display, navigational determinations, including: observed altitude, sight reduction, lines or circles of positions, and one or more fix of the user, or the image detectors geolocation.

IV Determination of Sextant Altitudes Navigational Data

A typical celestial navigational fix is determined by taking a plurality of "sites" with a sextant (also see FIG. 16, Flow Chart 2 and FIG. 17, Flow Chart 3). A sight, is the process of determining a sextant altitude of a celestial body or object. A sextant altitude may be used to derive observed altitude by correcting for environmental conditions. A sight reduction is the process of using a sight to derive a Line of Position. A line of position may be plotted on a chart as a line of possible positions on which the image detector or observer is located. A fix is the intersection of 2 or more Lines of Position establishing a geographic location. For a further description of the sight reduction method of this embodiment see "The Nautical Almanac" (2016) published jointly by United States Naval Observatory (USNO) and The United Kingdom Hydrographic Office, pages 277-283. Also see also "The American Practical Navigator" Pub. No. 9, (2002) originally by Nathaniel Bowditch, published by the National Imagery and Mapping Agency. All of the references cited in herein are hereby incorporated by reference in their entirety.

FIGS. 6, 7, 8, 9 and 10 illustrate an exemplary sight reduction of stars from sextant altitude measured by the DIS. The imaging device has captured an image which includes the star Mirphak and the earth's horizon. Representative pixels of the star and the earth's horizon intercept have been selected by the user (as described in selection VI) and are imported into the computational element. Also, communicated to the computational element, in this example, via input by the user, are the time and customary conditions of celestial navigation, those being: temperature, pressure, "height of eye" and the speed and heading of the observer (see Environmental Conditions Section V).

Figure 7:
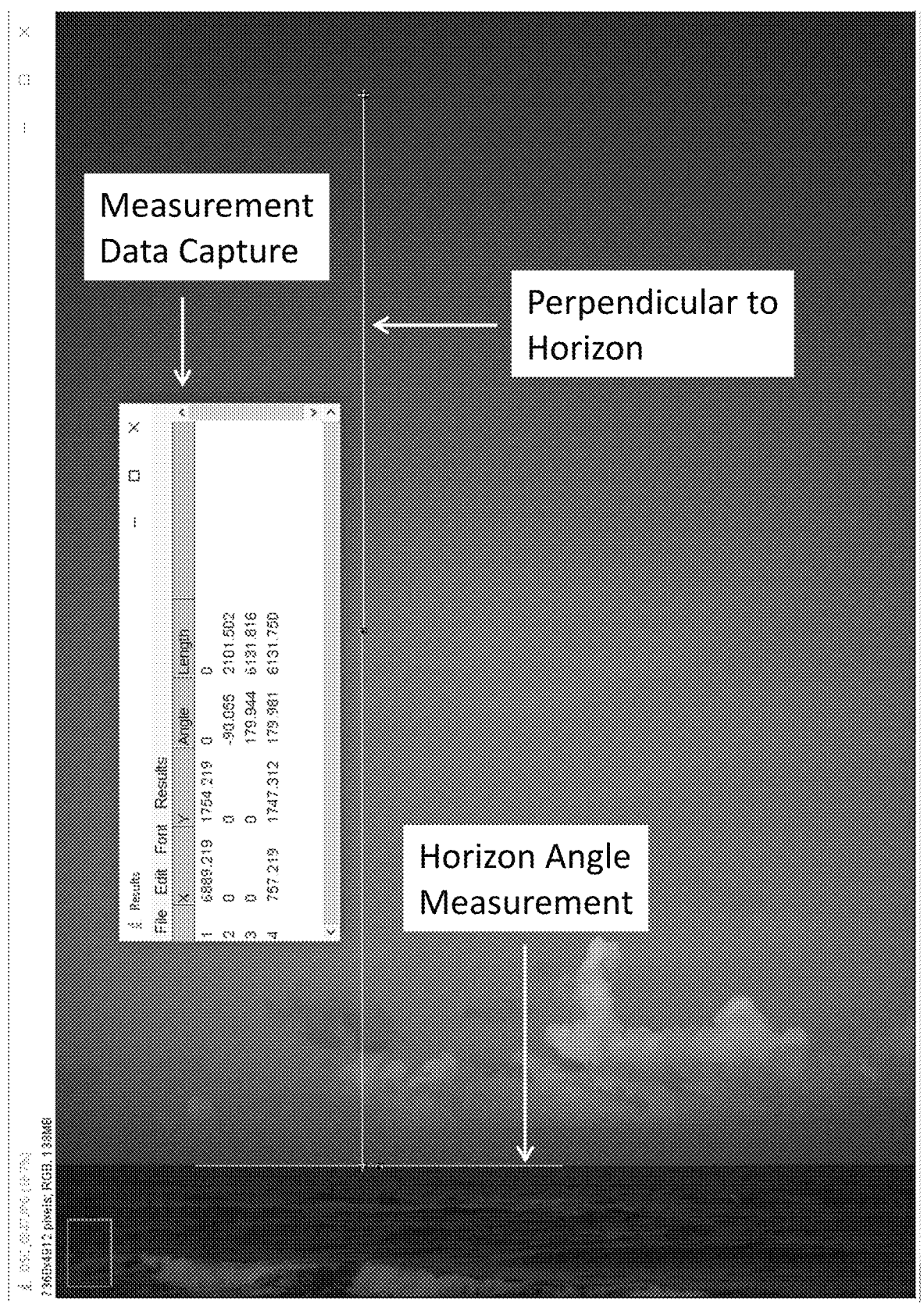
FIG. 7 further illustrates the image of FIG. 6 with data overlays, denoting the measurement of the horizon angle, and a perpendicular line intersecting the star and the horizon. The pixel x and y coordinates are determined for persistent storage, as shown in the table labeled Measured data capture.
Figure 8:
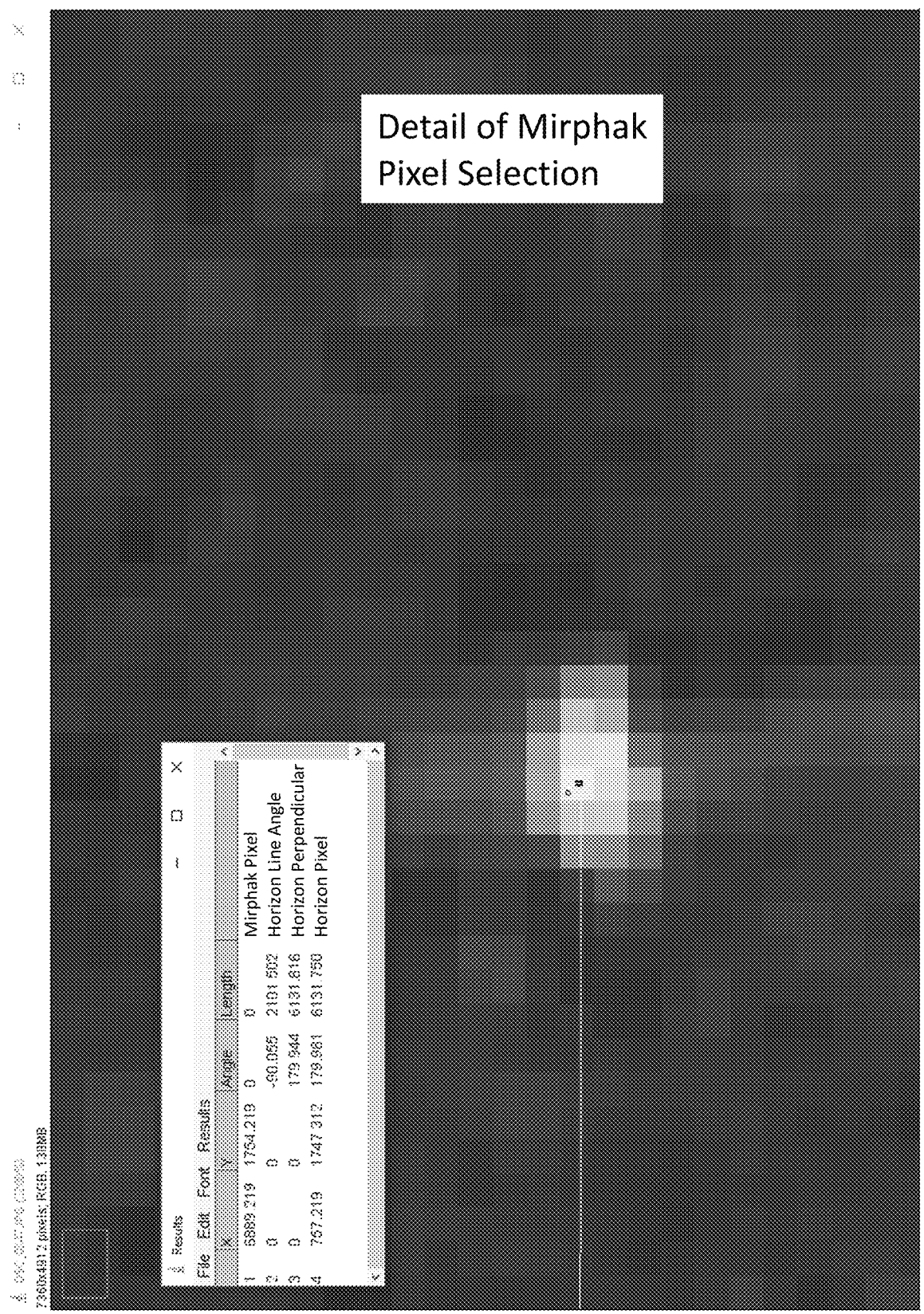
FIG. 8 is an enlarged more detailed illustration of the pixel selected for the star Mirphak. The pixel x and y coordinates are determined for persistent storage, as shown in the table labeled Measured data capture.
Figure 9:
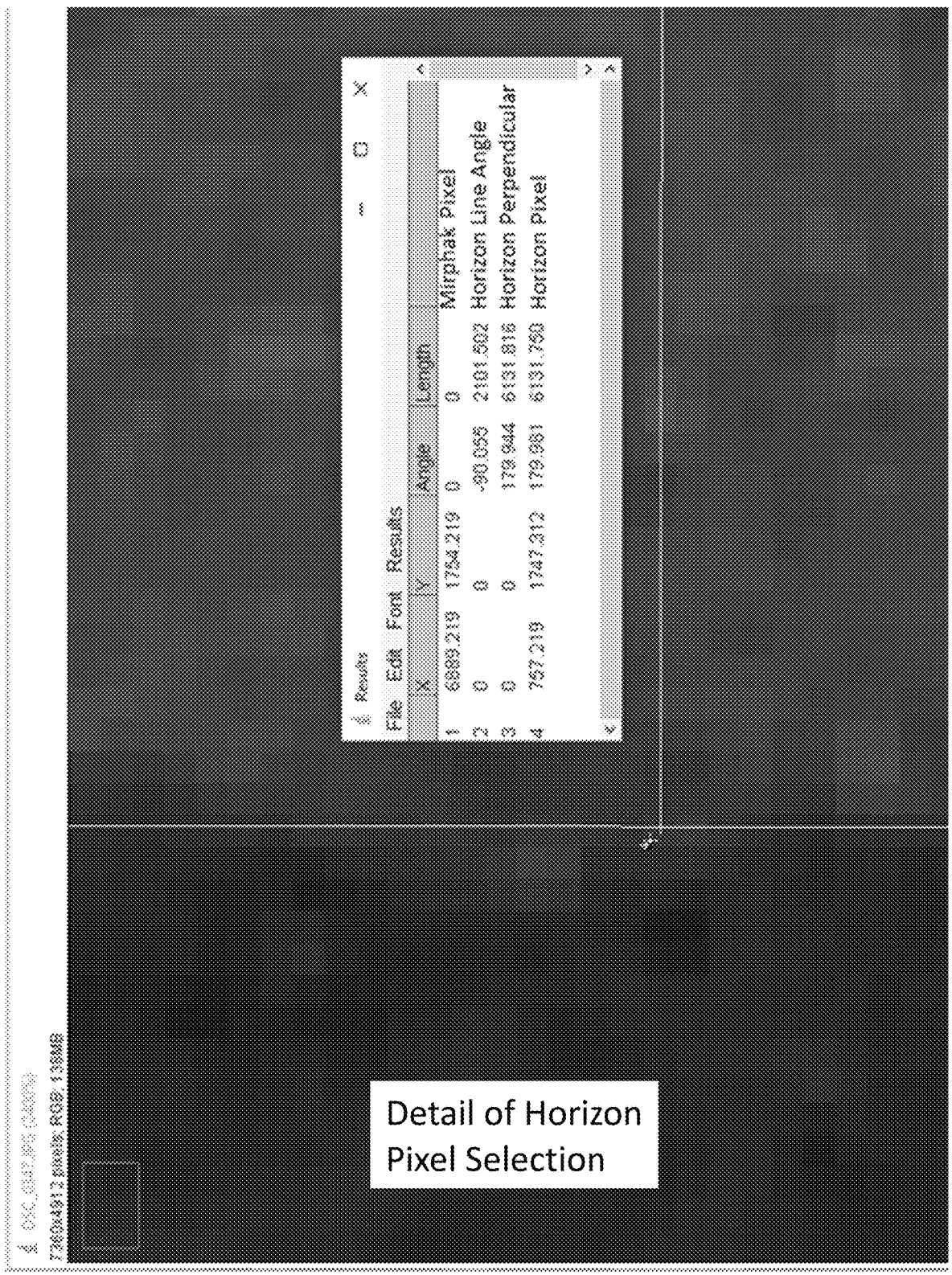
FIG. 9 is an enlarged more detailed illustration of the pixel selected for the horizon intercept of Mirphak. The pixel x and y coordinates are determined for persistent storage, as shown in the table labeled Measured data capture.

In reference to FIG. 7, one or more images of one or more celestial bodies or objects and the earth's horizon are captured with the imaging device element of the DIS. FIG. 7 further illustrates the image of FIG. 6 with data overlays, denoting the measurement of the horizon angle, and a perpendicular line intersecting the star and the horizon. FIG. 7 also shows the celestial body and horizon pixel locations captured in the table labeled "Measurement Data Capture" (lines 1 & 4). Values from the table are imported into the interface shown in FIG. 10 and used by the computational element to determine the angular distance in the following step. FIGS. 8 and 9 show a more expanded and detailed view of FIG. 7.

Figure 10:
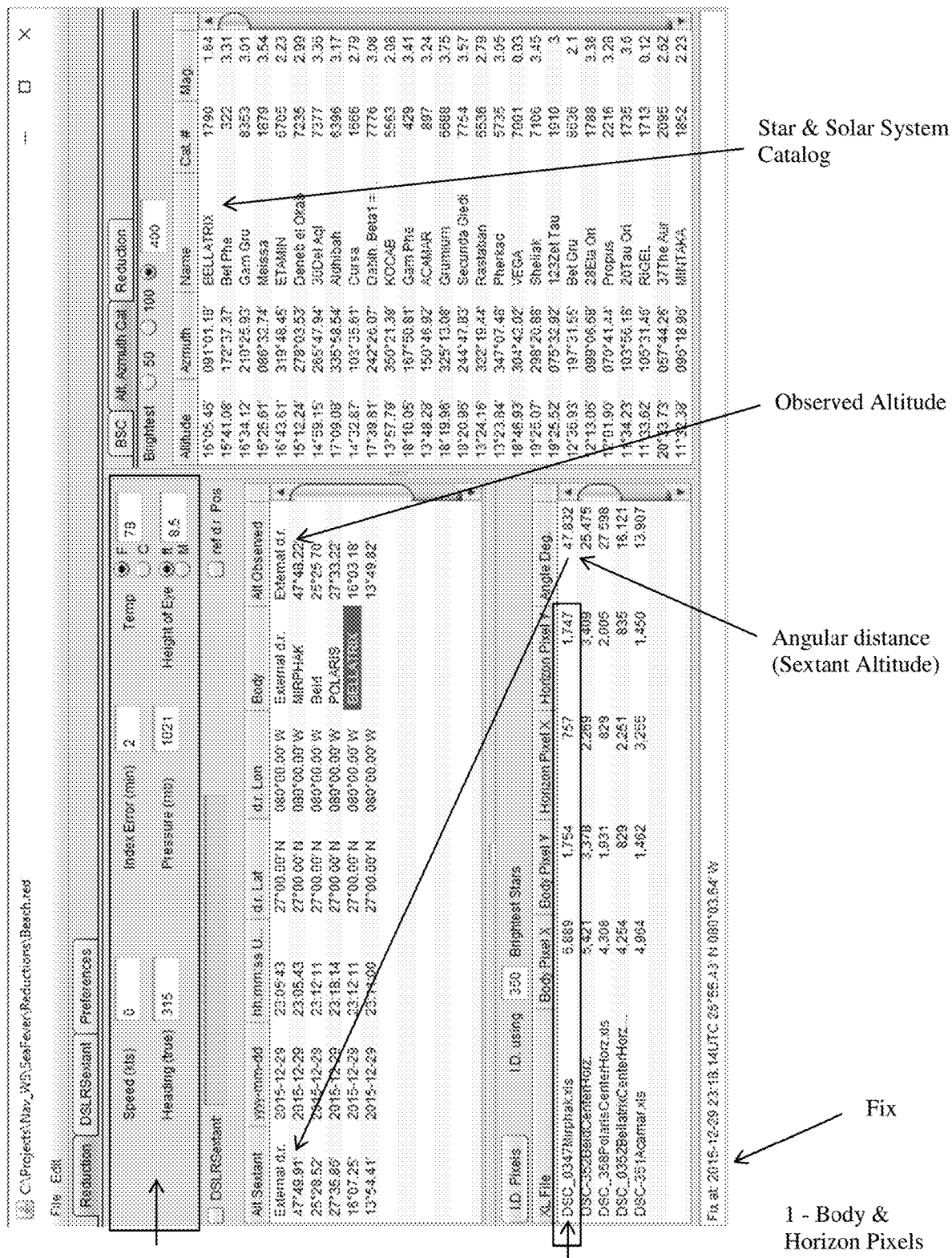
FIG. 10 illustrates the Digital Sextant output, displaying to the user, Sextant Altitude, Observed Altitude, a slight reduction, and Fix based on stars: Mirphak, Beid, Polaris, and Bellatrix as in the example shown in FIGS. 7, 8, and 9.
Figure 11:
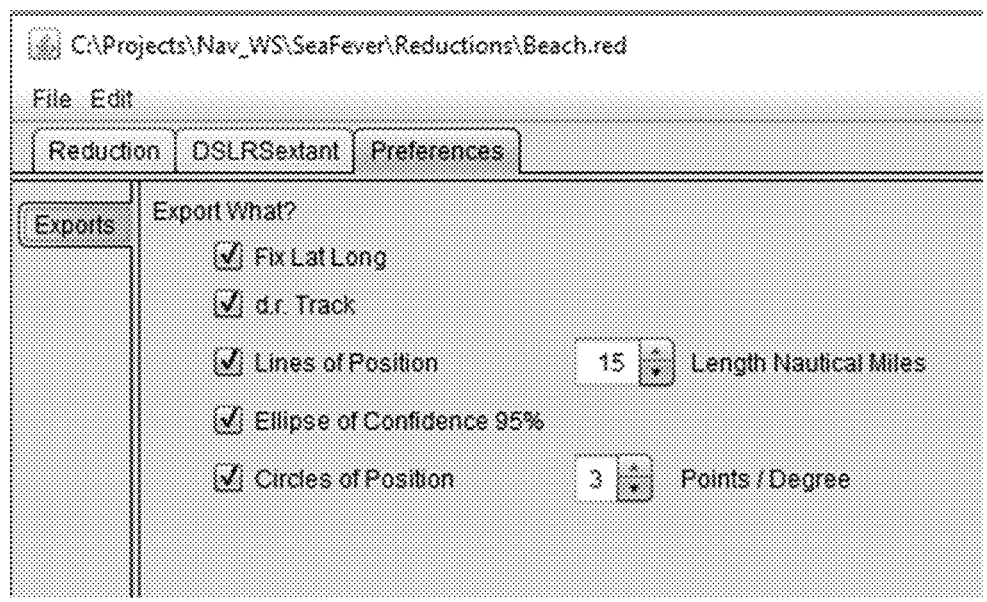
FIG. 11 illustrates the dialog box or user interface that allows the user to select what data will be exported for plotting. In this exemplary embodiment, the user may select data useful in celestial navigation: Refereed to in terms of art: a Fix expressed in Latitude and Longitude, d. r. Track (Dead Reckoning Track), Lines of position, Ellipse of 95% confidence of location, and Circles of position, as defined below.
Figure 12:
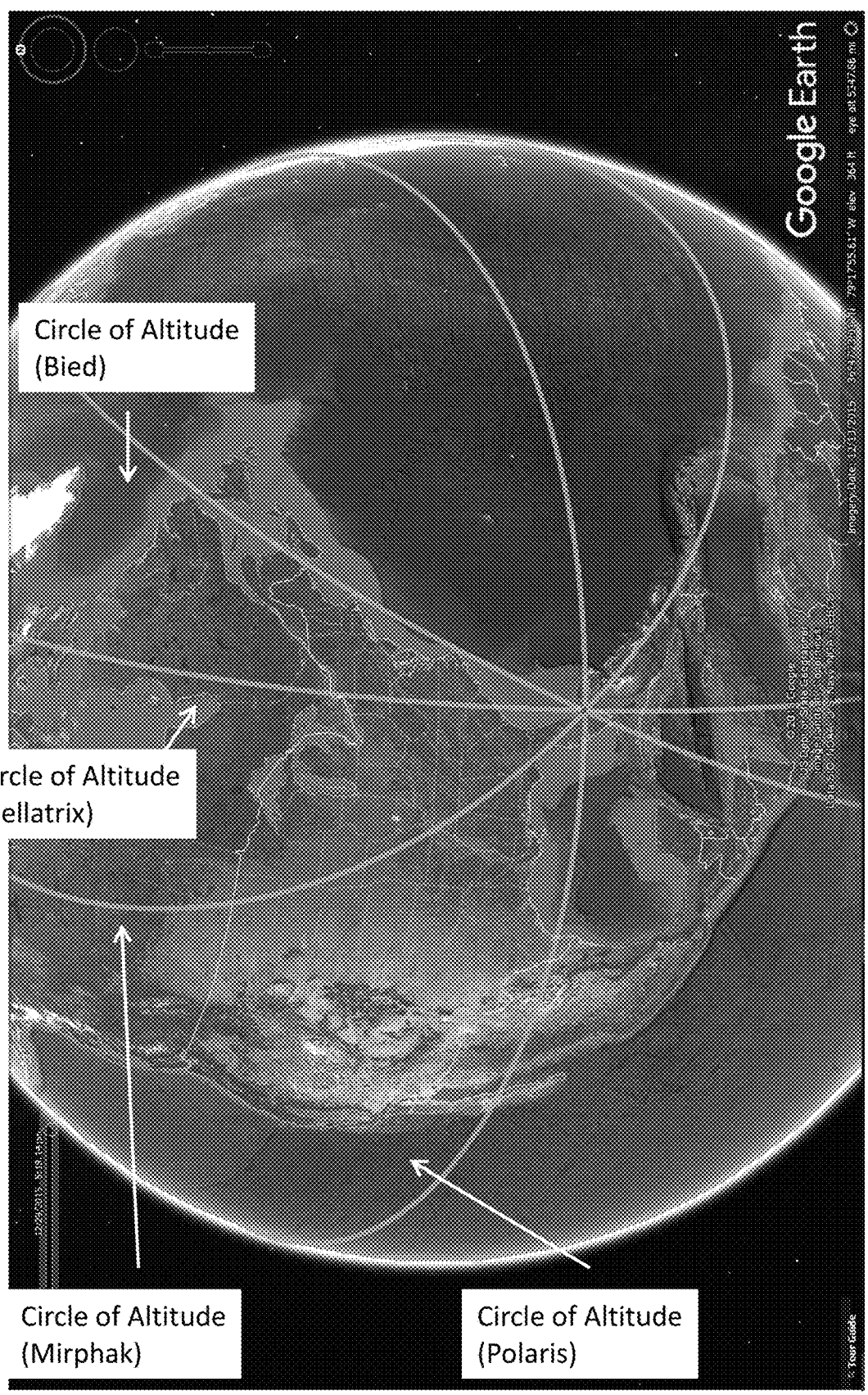
FIG. 12 illustrates a plot of the data selected for export in FIG. 11. In this example the data is displayed using Google Earth®. At this level of zoom, only the Lines of Position are visible and their intersections are near the southeast coast of Florida.
Figure 13:
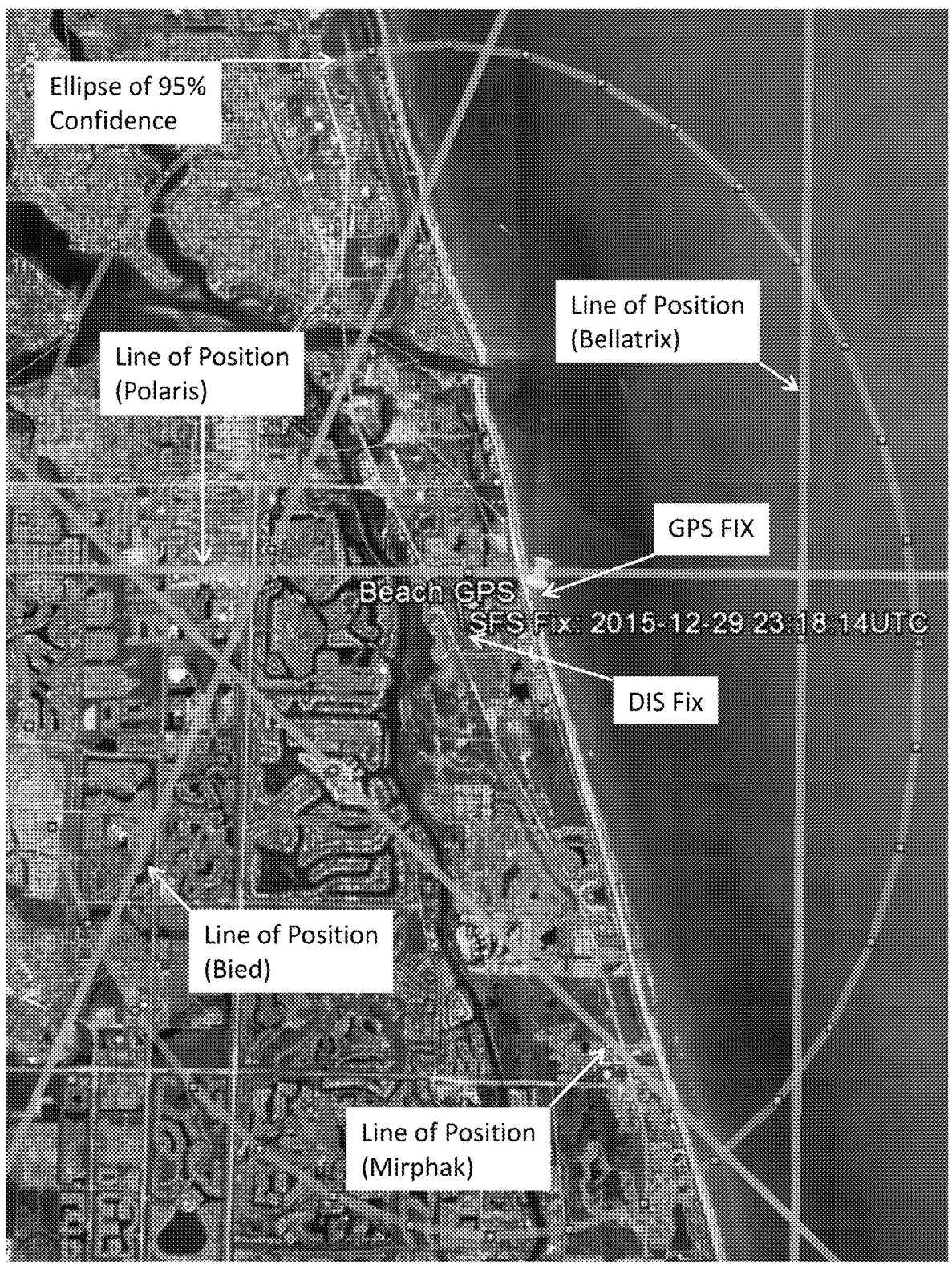
FIG. 13 illustrates an enlarged more detailed view of FIG. 12. It shows the Ellipse of 95% Confidence at the intersecting Lines of Position, the calculated fix from the Digital Image Sextant and a GPS fix used for independent verification.
Figure 14:
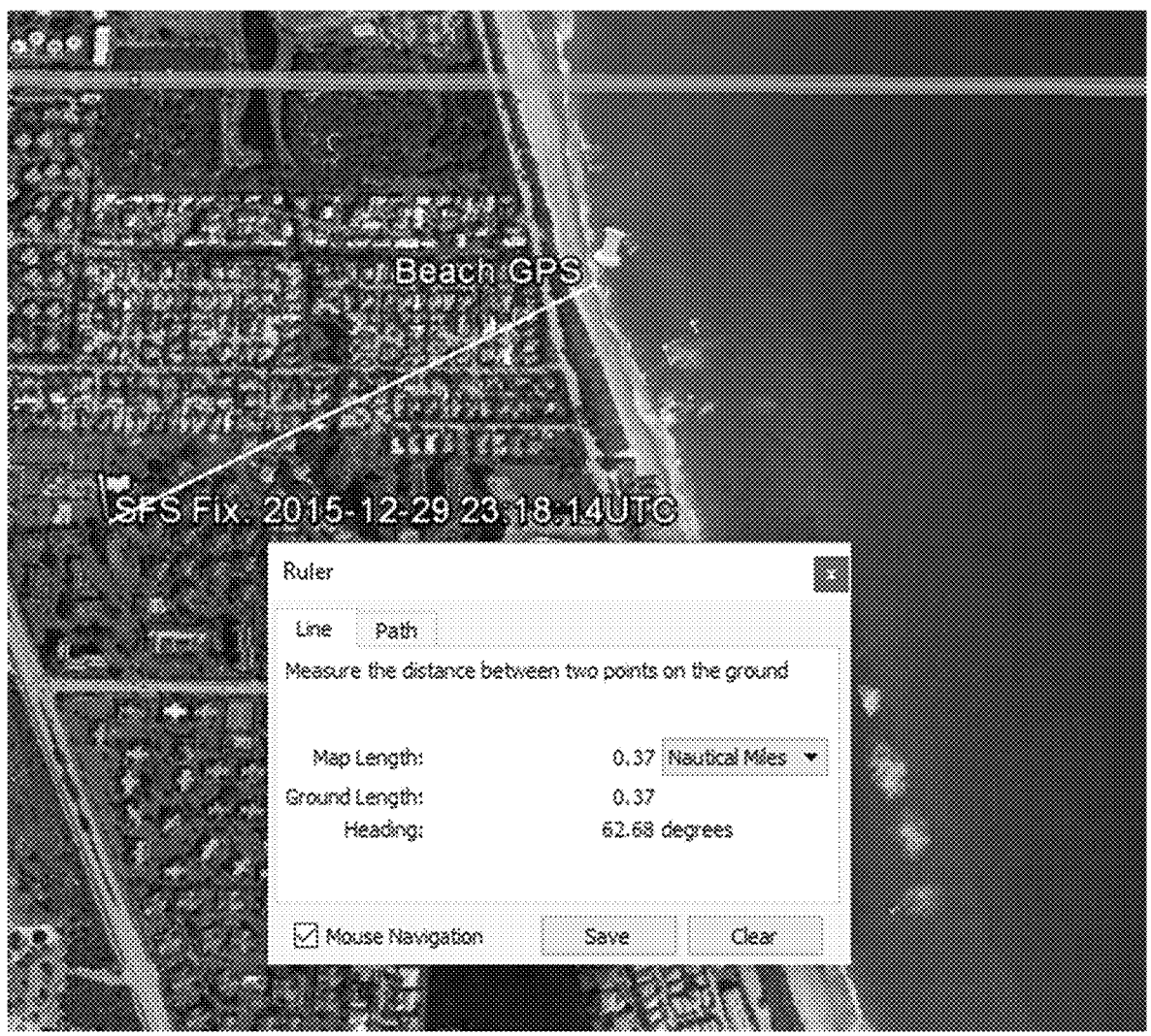
FIG. 14 illustrates a further enlarged more detailed view FIG. 12 and FIG. 13, showing the fix determined by the invention, and a GPS determined fix for comparison and collaboration.

In reference to FIG. 10, an analysis of the images captured in FIGS. 7, 8 and 9, has been performed and displayed by the computational element. The lower left table displays imported star and horizon pixel coordinates from the image of the celestial body above the horizon from the previous step (see FIGS. 7, 8, and 9). The line labeled "1-Body & Horizon Pixels (Mirphak)" displays the imported pixel locations of the star Mirphak and the intercept of a perpendicular line (relative to the horizon), descending from Mirphak and to the horizon. The angular distance, or sextant altitude between the two pixels has been calculated by the computational element of the DIS and displayed as "47.832" degrees. The angle is displayed in the upper table in the column labeled "Altitude Sextant" in the format of 47 Degrees and 49.91 Minutes. The field labeled "Observed Altitude" shows the sextant altitude corrected for the customary conditions of observation as described below. FIG. 10 also illustrates a similar analysis of 3 additional stars, those being: Beid, Polaris and Bellatrix. From observed altitudes, the computational element has calculated lines of position for each of the stars by reference to the celestial data base and calculated the intersection of these lines of positions, thereby determining a "Fix", which is displayed as labeled at the bottom of the interface.

The computational element will use the angular distance or sextant altitude, to calculate any one or more the traditional navigational parameters, including but not limited to those described by terms of art as, observed altitudes, sight reductions, circles of positions, lines of positions, and/or a fix, or fixes. Methods to calculate these navigational parameters are well known and described in detail in "The Nautical Almanac" (2016) published jointly by United States Naval Observatory (USNO) and The United Kingdom Hydrographic Office, pages 277-283. Also see also "The American Practical Navigator" Pub. No. 9, (2002) originally by Nathaniel Bowditch, published by the National Imagery and Mapping Agency, all of which are incorporated by reference in their entirety.

V Environmental Conditions

The environmental conditions of celestial navigation and the motion of the observer are captured. The following environmental conditions or customary conditions of observation may be manually entered as in this example or the system may include sensors and a means to automatically capture conditions:

a. Time the image was captured to the second in UTC (Universal Time Coordinated). The DIS used in this embodiment captures and stores the time automatically with the image.

b. "Height of Eye" how high above sea-level (feet or meters) the DIS is at the time of the image capture.

c. Temperature d. Pressure e. Speed & heading (for running fixes)

f. Estimated Position in Lat. Lon. This value is not required for the fix. It is however customary in celestial navigation and allows the software to help identify the celestial body used for the sight.

VI Selection of Representative Pixels and Reference to the Celestial Database

In reference to FIGS. 7, 8 & 9, measured "Sextant Altitudes" or angular distances of celestial objects above the horizon are illustrated. A digital image processer allows the user to select 1 pixel to represent each celestial body or object. In this non-limiting example, ImageJ open source tooling, obtained from the National Institutes of Health. For a detailed description, see Ferreira, Tiago, and Wayne Rasband. "ImageJ user guide." ImageJ/Fiji 1 (2012), incorporated herein by reference in its entirety. In the exemplary embodiment, ImageJ was utilized for the selection and recording of image pixels as detailed in the user's guide: More specifically, the user manipulates a pointing device, in the instant example, a mouse, to position a cursor over the desired pixel, and made the selection using primary button of the mouse. Referring to FIG. 8, the image was enlarged around the star to increase accuracy in pixel selection. Image processor functions such as "Find Maxima" found in ImageJ and described in the ImageJ user guide may also be used.

To determine a sextant altitude of an image the user will:
a. Select and capture the body pixel (x, y) location in ImageJ.
  a.1. For a star, either the brightest pixel or the center if more than one pixel is saturated.
  a.2. For objects, larger than point sources, by way of example, the sun and the moon, the user will select the pixel on the "lower limb" closest to the horizon or farthest from the horizon for the "upper limb". Upper and lower limb are terms of art for the edge of the body (sun, moon, Venus) closest (lower) or furthest (upper) from the horizon.
b. Measure the angle of the horizon with the line tool.
c. Drop a perpendicular line from the body pixel to the line of the horizon.
d. Select and capture the horizon pixel (x, y) at the intersection of the perpendicular and the horizon.
e. Refer to the bottom left table of FIG. 10: Import the body and horizon pixels and the calibrated DIS will translate the two pixel locations into the "sextant altitude"

Reference to the Celestial Database

In reference to the Star & Solar System Catalog table of FIG. 10: The user selects the Celestial body observed. If a non-point source body like Sun or the Moon was observed, the user is prompted to select the upper or lower limb.
a. If the estimated position was entered in Section V step f, the software will suggest the body you observed by sorting the sky into bodies observable at that altitude from the estimated position at the date and time of the observation.
b. It will also display the azimuth to the body from the estimated position to assist in body identification and selection.

VII Plot Fix

Sight reduction is fully automated from raw inputs, including correction of sextant altitudes to "observed altitudes" the term of art for altitudes corrected for observation conditions including the following (the following are terms of art in celestial navigation):
a. Dip (from Height of Eye)
b. Atmospheric Refraction corrected for temperature and pressure
c. Where needed: (For bodies whose angular size is significant to the measured altitudes)
  c.1. Semi-Diameters
  c.2. Augmentation of the moons semi-diameter
  c.3. Parallax in Altitude
  c.4. Moons Horizontal Parallax
  c.5. Obliquity of earth for moon observations Display/Plot Fix. In reference to bottom line of FIG. 10: Once 2 or more sights are entered the fix is displayed. With 3 or more sights the fix includes an error estimated called the ellipse of 95% confidence. The true position is 95% likely to fall inside the ellipse according to the input data. The error estimate in this embodiment is done by linear least squares analysis (also see FIG. 17, Flow Chart 3).

In reference to FIGS. 11, 12, 13 and 14: Fix information is exported from the DIS (Digital Imaging Sextant) software and displayed using plotting tools. In this embodiment, the exported fix information is in the GPX format. GPX is an open and free standard for the exchange of GPS data. The system output is not limited to Google Earth but may be displayed with any geographical mapping interface enabled to plot longitude and latitude coordinates.

Example 2

Lake Michigan
Experimental Conditions
The Digital Image Sextant (DIS)

The celestial fixes presented in Example 2 were all made with the same DSLR (Digital Single Lens Reflex Camera) and lens: a Nikon D-810® camera and Sigma DG 067® (35 mm F1.4) lens.

The dimensions X, Y and pixels M, N of the CMOS detector are,
  X=35.9 mm & M=7360 pixels.
  Y=24.0 mm & N=4912 pixels The field of view (FOV) is 54.3 degrees of arc calculated as follows:

$$FOV = 2\tan\left(\frac{sizeX}{2*\text{Focal Length}}\right) = 2\text{atan}\left(\frac{35.9 \text{ mm}}{2*35 \text{ mm}}\right) = 54.3 \text{ degrees}$$

Exposure

Exposure parameters are designed to accommodate measurements taken on moving platforms. All images were taken hand held.
  Exposer time: 1/125 sec
  ISO Speed: 12,800
  F-Number: variable Procedure The Yale Bright Star Catalog (Hoffleit, et al., "The Bright star catalogue." New Haven, Conn.: Yale University Observatory, c1991, 5th rev. ed., edited by Hoffleit, Dorrit; Jaschek, Carlos (1991)) was incorporated into the celestial navigation software (J2000 epoch) and is used throughout the calibration and navigational fixes. "AstroLib" Java libraries by Mark Huss at mhuss.com was incorporated with the Yale Bright Star Catalog as the solar system ephemeris.

The Right Ascension & Declination (RA-dec) of each star is corrected for proper motion at the time of observation using the FK-5 system (J2000) values reported in the Yale Bright Star Catalog.

The procedure has three parts: Calibration of the DIS, Measure the altitude of a celestial object, and Celestial Fix with the DIS.

The Celestial Fix portion of the procedure details a fix taken at sea on Lake Michigan approximately 35 nautical miles off Racine, Wis.

Calibration of the DIS

The detector and lens combination were calibrated to yield a known and constant pixels/degree-arc across the image.

The calibration method is outline below:
1. Image of Stars: An image of stars that span nearly the full extent of the detector was captured.

2. Associate Stars and Pixels: The stars were identified and their celestial coordinates used to calculate a known angular distance between any two. The pixel location x, y for each star in the image was associated with each identified star, allowing an actual angular distance between the pixels to be calculated.

3. Calibrate the Device: A 3rd order polynomial regression was run to obtain the coefficients needed to calculate fictitious "undistorted" pixel coordinates x', y' for each pixel x, y. Undistorted x', y' yield a known and constant pixels/degree across the image. The coefficients and pixels/degree value are stored and used to calculate the angular distance between any two pixels in any image from the calibrated device.

The lens and detector combination utilized was rectilinear. E.g. the image distorts angular distance to make straight lines appear straight similar to a gnomic projection.

Step 1: Image of Stars

To calibrate the DIS, an image of stars near the observer's zenith was captured. Near zenith was chosen to minimize the effects of atmospheric refraction. The calibration image includes the constellation Cassiopeia and nearby stars, FIGS. 18 & 19.

Step 2: Associate Stars and Pixels

The observation conditions of the calibration image are shown in Table 1 below.

TABLE 1

Observation conditions:

| Date (UTC) | 2015-12-16 03:19:11 |
|---|---|
| Latitude | 38°34.02' N |
| Longitude | 090°03.45' W |
| Temp. (C.) | 3.9 |
| Pressure mbar | 1012 |

The observation conditions were used to calculate the refraction correction to the apparent celestial coordinates of each body. The refraction correction was calculated by first calculating the Right Ascension & Declination (RA-dec) of the observer's zenith using the observer's Latitude/Longitude (LAT/LONG) and local sidereal time (LST).

The zenith distance of each observed star was calculated by the angular distance between the RA-dec of the star and the RA-dec of the observer's zenith using the Vincenty formula (Vincenty Thaddeus (1975-04-01). "Direct and Inverse Solutions of Geodesics on the Ellipsoid with Application of Nested Equations" (PDF). Survey Review. Kingston Road, Tolworth, Surrey: Directorate of Overseas Surveys. 23 (176): 88-93. doi:10.1179/sre.1975.23.176.88. Retrieved 2008-07-21.) as follows:

$$\Delta\sigma = \arctan\frac{\sqrt{(\cos\phi_2 * \sin(\Delta\lambda))^2 + (\cos\phi_1 * \sin\phi_2 - \sin\phi_1 * \cos\phi_2 * \cos(\Delta\lambda))^2}}{(\sin\phi_1 * \sin\phi_2 + \cos\phi_1 * \cos\phi_2 * \cos(\Delta\lambda))}$$

Where:
$\Delta\sigma$=angular distance between 2 coordinates in degrees
$\phi_1$ & $\phi_2$=the declination of coordinates 1 & 2 in degrees
$\Delta\lambda$=absolute difference in Right Ascension in degrees The star's altitude above the horizon is calculated according to:

Altitude=90−$\Delta\sigma$ (its zenith distance)

The refraction correction is calculated using the method of Bennett (Bennett et al., (1982) The Journal of Navigation 35.2: 255-2597):

$$Ref = \cot\left(h_a + \frac{7.31}{h_a + 4.4}\right) * \left(\left(\frac{p_{mbar}}{1010}\right) * \left(\frac{283}{t_c + 273}\right)\right)$$

Where:
$h_a$=apparent altitude (corrected for dip and index error)
$p_{mbar}$=atmospheric pressure in millibars
$t_c$=Temperature in degrees Celsius The apparent celestial coordinates of the star are obtained by advancing the bodies catalog RA-dec toward zenith by the refraction correction.

The pixels mapped to stars in the calibration image are shown in Table 1. Table 1 also shows the catalog RA-dec of each star prior to refraction and proper motion correction to apparent RA-dec.

The angular distance of each star from the central most star in the image (45 Eps Cassiopeia) is calculated using the Vincenty formula (Vincenty, Thaddeus (1975-04-01). "Direct and Inverse Solutions of Geodesics on the Ellipsoid with Application of Nested Equations" (PDF). Survey Review. Kingston Road, Tolworth, Surrey: Directorate of Overseas Surveys. 23 (176): 88-93. doi:10.1179/sre.1975.23.176.88. Retrieved 2008-07-21.). The input RA_DECL for each star is corrected for refraction and proper motion prior to calculating the apparent angular distance. The resultant angular distances are the expected angular distances that the DIS will be calibrated against.

Step 3: Calibrate the Device

The "Fit Error" in Table 1 is measured in degrees arc. It is the difference between the expected angular distance calculated above and the DIS angular distance measured by Cartesian distances between the calibrated pixels (x', y').

i. Calibration (Distortion Correction)

For a pixel at position x, y calculate a new position x', y' (see Hughes, Ciarán & Denny, Patrick & Jones, Edward & Glavin, Martin. (2010). Accuracy of fish-eye lens models. Applied optics. 49. 3338-47. 10.1364/AO.49.003338.; H. Dersch, (1998):

radius = Min{$M, N$}/2

$dx = (x - Xcenter)$ $dy = (y - Ycenter)$ radial distance = $r = \dfrac{\sqrt{dx^2 + dy^2}}{\text{radius}}$ In contrast to Example 1 an alternative preferred correction factor was used in Example 2, and designated herein as cf':

$cf' = |Ar^3 + Br^2 + Cr + D|$ $x' = Xcenter + (dx * cf)$ $y' = Ycenter + (dy * cf)$ Where:
M & N are the number of X & Y pixels
X center=M/2, Y center=N/2
cf is the radial correction factor
A, B, C are empirically determined by the calibration and D=1−A−B−C.

ii. DIS Angular Distance:

For two pixels xy1 and xy2 apply Distortion Correction to each to yield xy1' and xy2':

$$dx'=x1'-x2'$$

$$dy'=(y1'-y2')*yxRatio$$

Where:
yxRatio ratio of the length of the x & y sides of a pixel to compensate for rectangular pixels.

$$\text{Angular distance (degrees)} = \frac{\sqrt{dx'^2 + dy'^2}}{\text{pixels/deg}}$$

iii. Calibration of A, B, C, Pixels/Deg and yxRatio for the DIS:

A polynomial regression is performed to determine coefficients A, B, C and pixels/deg that yield the best fit of the DIS measured angles to the expected angles. The method is a permutation analysis of the parameters.

For each permutation of values (A, B, C, pixels/degree) the angular distances of each star from the centermost star is calculated using i & ii above.

a) The range of the permutation values used for A, B & C is 1.0, 1.0 and 0.002 respectively.
b) The range of values for pixels/degree is +/−10% (13.5) of the theoretical value of 135.5=7360 pixels/54.3 degree field of view.
c) The minimum step in a value parameter is its range/$10^5$
d) yxRatio was iterated separately and yielded 1.00012 The value is below significant digits in measured values meaning the pixels are effectively square.

The fit of the DIS distances to the expect distances is evaluated by a Least Squares analysis.

$$\text{Error}=\Sigma_{Stars}(\angle E_i - \angle D_i)^2$$

Where:
Angles are from stars to the centermost star in the image (45Eps Cas)
$\angle E_i$ Expected angle using RA_DECL of each star
$\angle D_i$ DIS sextant angle from the pixel (x, y) of each star
The values for A, B, C, pixels/degree, and yxRatio that yield the lowest error are stored and shown in Table 2 below. The calibrated DIS can now express the angular distance between any 2 pixels in future & past images.

TABLE 2

DISs calibration values

| A $3^{rd}$ Order | 0.00211 |
|---|---|
| B $2^{nd}$ Order | −0.0370541 |
| C $1^{st}$ Order | 0.0014529 |
| Pixels/degree | 125.54310 |
| y/x Pixel size | 1.00012 |

DIS Altitude of a Celestial Body

Obtaining an altitude is a three-step process.

1. Capture an image of the object and the horizon with the conditions of the observation including temperature, time, pressure, "height of eye", speed, and heading. DR or estimated position is optional. With an estimated position, the DIS software can help identify the observed body by its azimuth and altitude above the observer's horizon.

2. Select two pixels: a pixel to represent the celestial object and a pixel for the horizon directly below the object.

3. Import the 2 pixels into the calibrated DIS software to yield the sextant and observed altitudes.

Step 1: Capture Image

Figure 20:
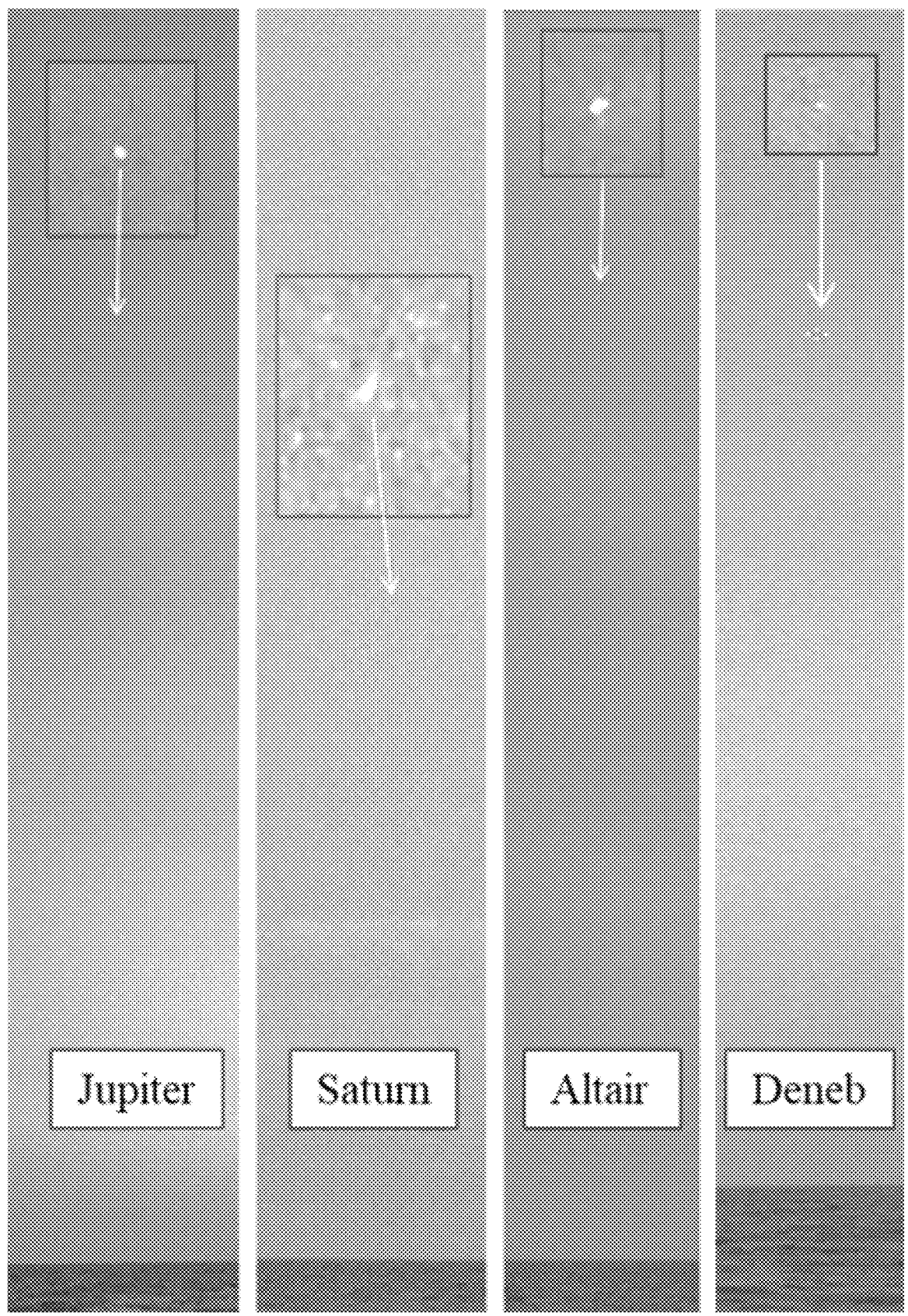
FIG. 20 illustrates DIS Altitude Image Fragments

FIG. 20 shows image fragments of 4 bodies—Jupiter, Saturn, Deneb and Altair—captured while taking a fix under sail. The fragments are displayed at different zooms and with increased brightness for clarity in print. Time was recorded by the camera in the image data. The exposure information is taken directly from the image of Jupiter DSC_2021.JPG as shown in Table 3 below.

TABLE 3

Exposure information from the image of Jupiter DSC_2021.JPG

| Exposure Time | $\frac{1}{125}$ sec |
|---|---|
| F-Number | F6.3 |
| Exposure Program | Shutter priority |
| ISO Speed Ratings | 12800 |
| Date/Time Original | 2017:07:16 01:51:36 |
| Date/Time Digitized | 2017:07:16 01:51:36 |
| <xmp:CreateDate> | 2017-07-16T01:51:36.75 |

Figure 21:
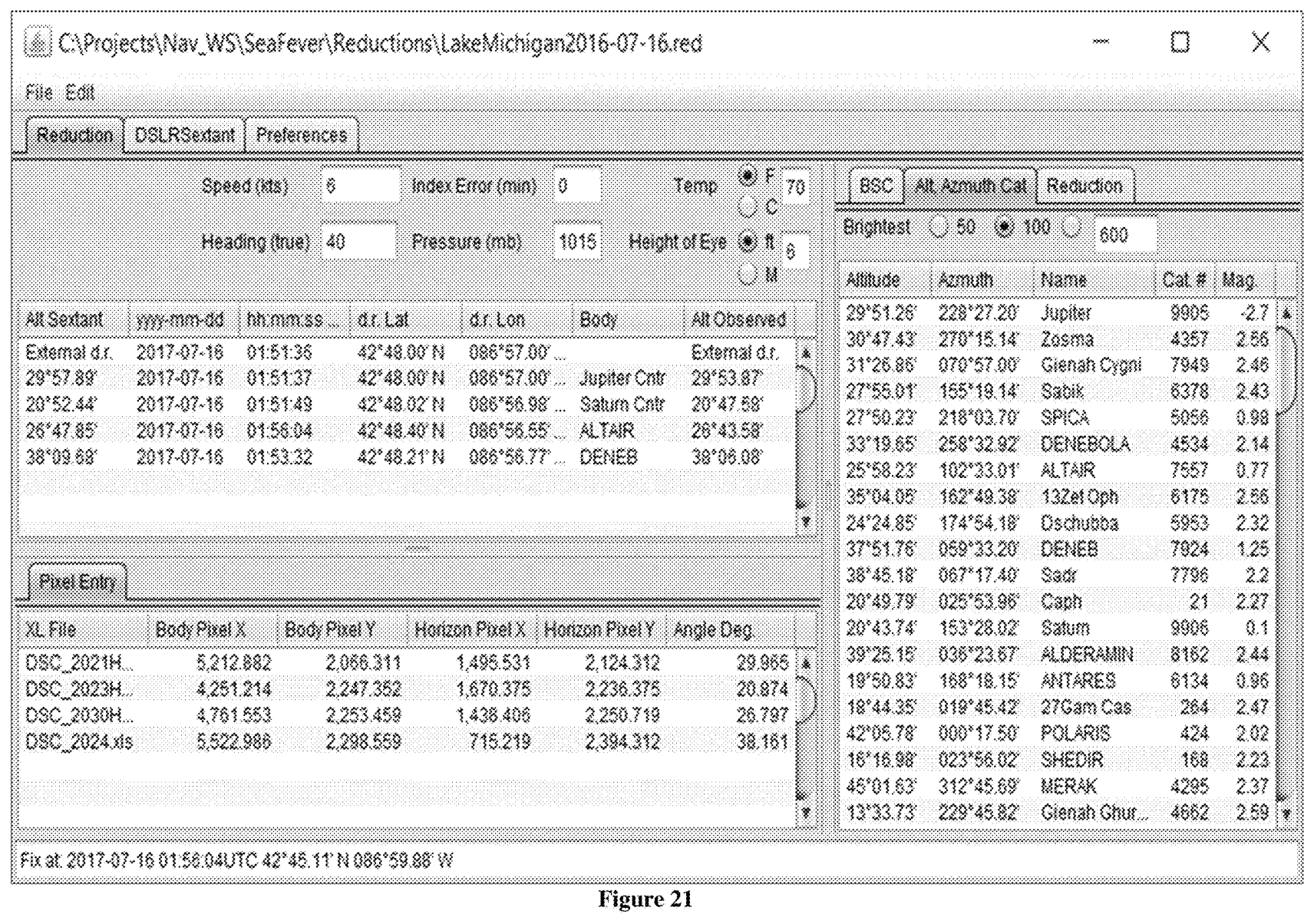

The observation conditions taken from FIG. 21 are shown in Table 4 below.

TABLE 4

Observation conditions from FIG. 21.

| Speed | 6 kts |
|---|---|
| Heading (true) | 40 |
| Pressure | 1015 mbar |
| Temp | 21.11° C. |
| HoE | 1.83 m (Height of Eye) |
| DR Pos | 42 48.00 N, 086 57.00 W |
| Time | 2017-07-16 01:51:37 UTC |

Note that the DR positions for subsequent observations are advanced by the software for convenience when new observation times are entered. The user can enter alternative values, but that was not done here.

Step 2: Pixel Selection

Figure 22:
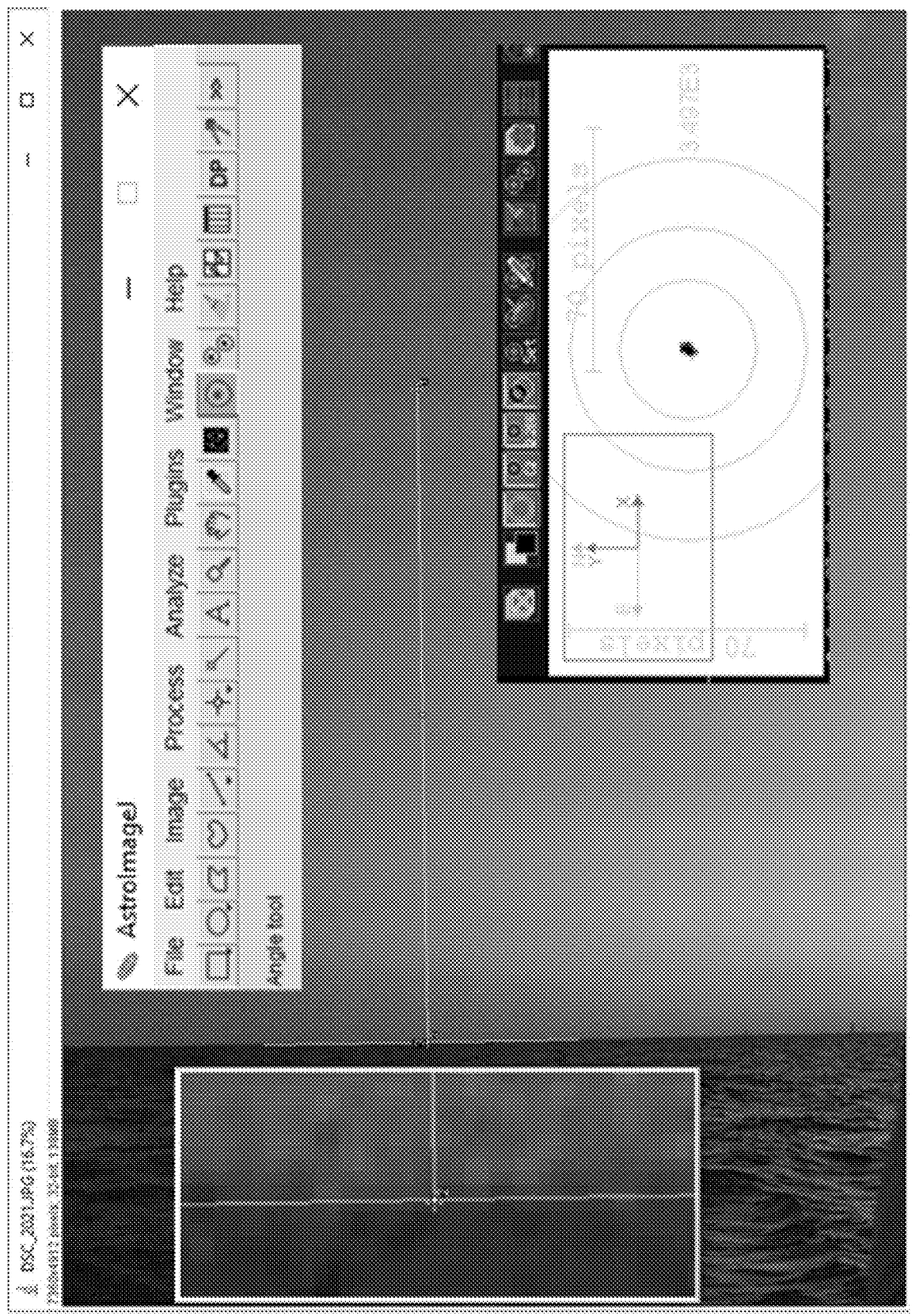
FIG. 22 illustrates AstroImageJ of Jupiter Altitude with Insets for Star & Horizon Pixel Selection.

Image processing was done using AstroImageJ (Collins, Karen A., et al. "AstroImageJ: image processing and photometric extraction for ultra-precise astronomical light curves." The Astronomical Journal 153.2 (2017): 77; Abrámoff, Michael D., Paulo J. Magalhães, and Sunanda J. Ram. "Image processing with ImageJ." Biophotonics international 11.7 (2004): 36-42.). For the measurement of all celestial objects, the centroid of the object was calculated by AstroImageJ Single Aperture Photometry Tool (FIG. 22 inset).

Horizon pixel selection was accomplished by drawing a line in AstroImageJ along the line of the horizon. See FIG. 22 inset. A line is drawn from the pixel of Jupiter to the line of the horizon that measures as perpendicular in AstroImageJ. Depth into the "gloom" of the horizon for pixel selection is accomplished by examining the surrounding horizon out to +−80 to 150 pixels and being 1 pixel below the deepest intrusion of sky as illustrated in FIG. 22.

The selected pixels and measured lines are saved by AstroImageJ to a TSV (Tab Separated Variable) file that is consumed by the DIS reduction software.

Step 3: Import Pixels

The lower left table on FIG. 21 shows the pixel imports. Line 1 is the import of Jupiter from the AstroImageJ results TSV file and the last column "Angle Deg." shows the angle in decimal degrees measured between the two pixels according to the DIS calibration. The value is also populated as degrees and decimal minutes in the sight reduction table (upper left table) first column "Alt Sextant".

DIS Celestial Fix

Process B (Obtain the altitude of a celestial object) was repeated for Saturn, Deneb and Altair, FIGS. 20 & 21. As soon as two sights are entered, the DIS software outputs a fix. With three or more sights the fix includes an error estimate as an ellipse of 95% confidence.

Computations of sight reductions and fixes use the method detailed in The Nautical Almanac (The Nautical Almanac" (2016) published jointly by United States Naval Observatory (USNO) and The United Kingdom Hydrographic Office, pages 277-283) and Bowditch (The American Practical Navigator" Pub. No. 9, (2002) originally by Nathaniel Bowditch, published by the National Imagery and Mapping Agency).

There is a notable exception to the fix calculation process from The Nautical Almanac; namely, the number of iterations to calculate the fix. In the almanac, the computation is repeated until the estimated position (the fix from the previous iteration) and the calculated fix have converged to within 20 nmi (nautical miles). The software used iterates until the fix and estimated position converge to within 0.1 nautical miles. The result is a sometimes measurably smaller ellipse of 95% confidence as well as shorter intercept distances "p" in reduction outputs.

TABLE 5

Figure 18:
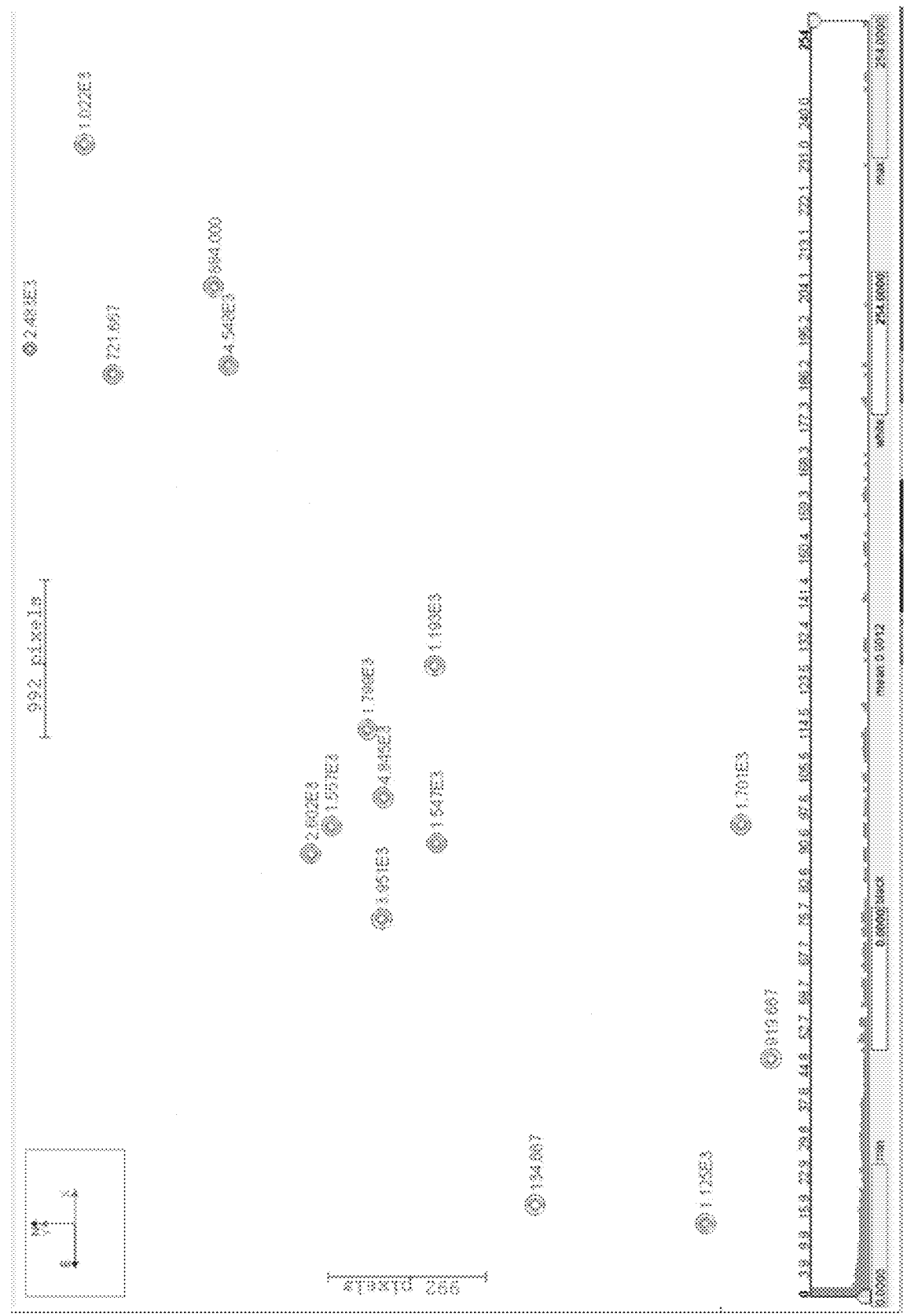
FIG. 18 illustrates Cassiopeia & vicinity black & white negative, AstroImageJ centroids are marked for enhanced clarity
Figure 19:
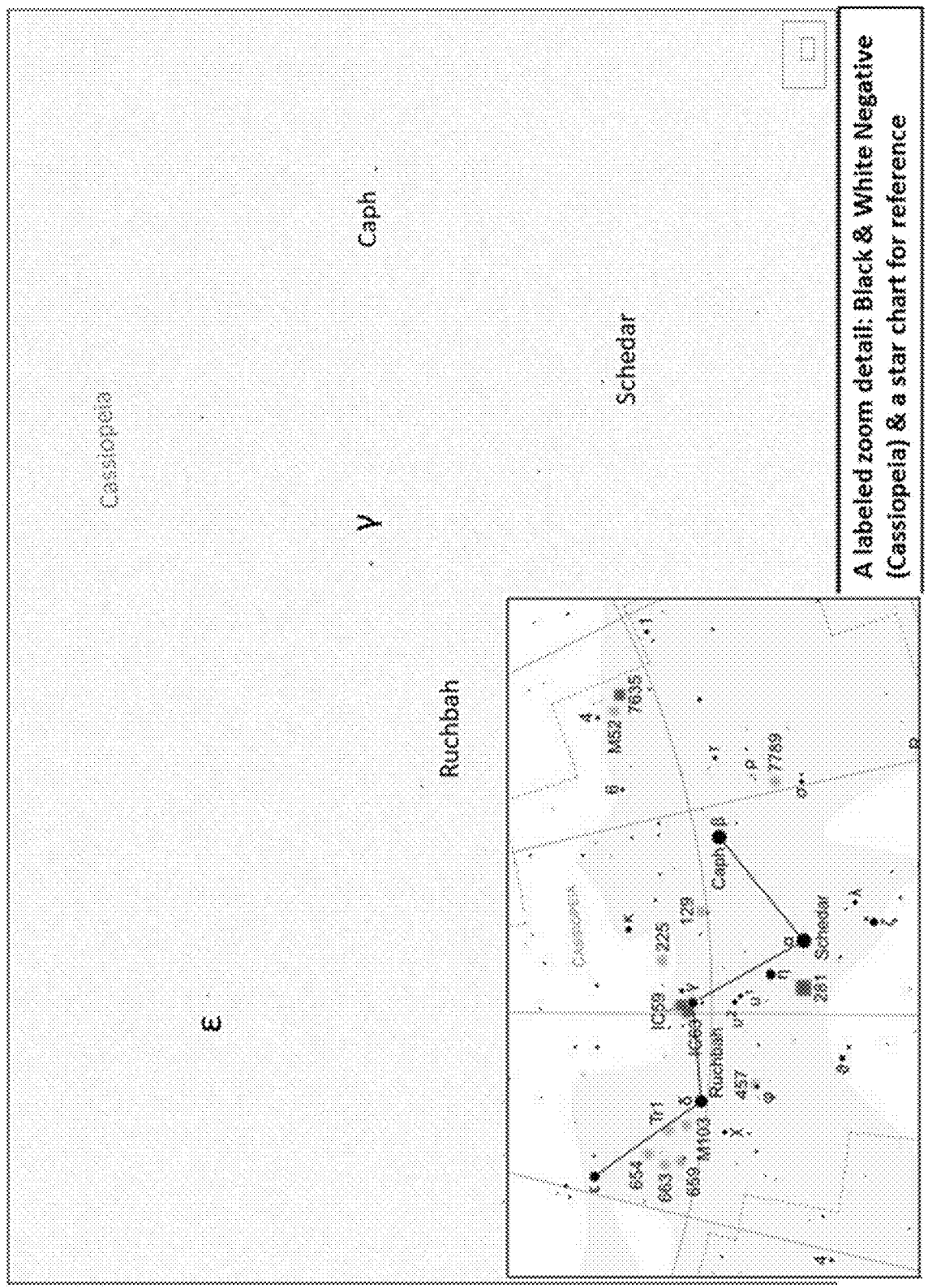
FIG. 19 illustrates an image zoomed to a visible scale for selected stars and rotated 180 degrees to align with chart.

Pixel to Celestial Coordinate Angular Distances Calibration of the DIS from FIGS. 18 & 19

| Star | Catalog Number | Pixel X | Pixel Y | Right Ascension | Declination | Fit Error Degrees |
|---|---|---|---|---|---|---|
| 45Eps Cas | 542 | 3809.854 | 2580.028 | 01:54:23.7 | 63°40.20' N | 0.0 (N/A) |
| MIRPHAK | 1017 | 5699.556 | 1284.218 | 03:24:19.4 | 49°51.67' N | 0.003696 |
| 27Gam Cas | 264 | 2978.178 | 2259.044 | 00:56:42.5 | 60°43.00' N | 0.001521 |
| Caph | 21 | 2216.466 | 2248.937 | 00:09:10.7 | 59°08.98' N | −1.44E−4 |
| ALGOL | 936 | 5802.125 | 38.045 | 03:08:10.1 | 40°57.33' N | 0.00409 |
| Ruchbah | 403 | 3407.265 | 2158.170 | 01:25:49.0 | 60°14.12' N | −7.11E−4 |
| SHEDIR | 168 | 2627.287 | 1801.105 | 00:40:30.5 | 56°32.23' N | −0.002343 |
| 39Del Per | 1122 | 6190.091 | 1193.260 | 03:42:55.5 | 47°47.25' N | 0.006782 |
| 45Eps Per | 1220 | 7090.571 | 378.659 | 03:57:51.2 | 40°00.62' N | 0.007861 |
| 15Kap Cas | 130 | 2695.417 | 2592.461 | 00:33:00.0 | 62°55.90' N | −0.002373 |
| 24Eta Cas | 219 | 2800.677 | 1927.875 | 00:49:06.0 | 57°48.95' N | 7.44E−4 |
| 27Kap Per | 941 | 5643.011 | 557.298 | 03:09:29.8 | 44°51.43' N | 0.005481 |
| Alderamin | 8162 | 298.336 | 4278.356 | 21:18:34.8 | 62°35.13' N | −0.008952 |
| Alfirk | 8238 | 1337.246 | 4691.652 | 21:28:39.6 | 70°33.65' N | −0.009583 |
| Alrai | 8974 | 2811.293 | 4504.503 | 23:39:20.8 | 77°37.95" N | −0.007486 |
| 21Zet Cep | 8465 | 416.564 | 3207.265 | 22:10:51.3 | 58°12.07' N | −0.008234 |

Fit Error after DIS calibration = ∠$E_i$ − ∠$D_i$ = Expected angle (Celestial Coordinates) − DIS angle (Pixels)

Results

A) Calibration

The DIS calibration method yielded a mean error in measured angular distance of 0.004375 degrees and a maximum error of 0.00958 degrees, Table 5.

The calibration yielded 125.5431 pixels/degree or inverted is 0.007965 degrees/pixel. The mean error of the calibrated distances is then 0.54925 the width of a pixel on the detector. The maximum error is 0.009583 degrees arc, which is 1.2031 the angular width of a pixel.

B) Celestial Fix 2017-07-16 UTC

Lake Michigan DIS sight reductions are shown in Tables 6 & 7.

TABLE 6

| Reduction Units | |
|---|---|
| Value | Legend |
| UTC | Universal Time Coordinated |
| DR lat | dead reckoning latitude |
| DR lon | dead reckoning longitude |
| RA | right ascension (hrs) |
| dec | declination (deg) |
| LST | Local Sidereal Time (hrs) |
| GHA | Greenwich Hour Angle (deg) |
| LHA | Local Hour Angle (deg) |
| Hc | Altitude computed (deg) |
| Hdis* | Altitude digital image sextant (deg) |
| Ha | Altitude apparent (deg) |
| SD | Semidiameter (deg) |
| HP | Horizontal Parallax (deg) |
| OB | Oblateness Corr. (deg) |
| Ho | Altitude observed (deg) |
| p | intercept (nmi) |
| z | azimuth (deg) |

*Hs (Sextant Altitude) = Hdis

TABLE 7

DIS Sight Reductions 2017 Jul. 16 UTC Fix

| Value | Jupiter | Saturn | Deneb | Altair |
|---|---|---|---|---|
| UTC | 1:51:37 | 01:51:49 | 01:53:32 | 01:56:04 |
| DR lat | 42°48.00' | 42°48.02' | 42°48.21' | 42°48.40' |
| DR lon | −086°57.00' | −086°56.98' | −086°56.77' | −086°56.55' |
| RA | 12.9606 | 17.4549 | 20.6905 | 19.8466 |
| dec | −4.8087 | −21.9296 | 45.2803 | 8.8702 |
| LST | 15.6667 | 15.6701 | 15.699 | 15.7415 |
| GHA | 127.5943 | 60.2296 | 12.1257 | 25.4203 |
| LHA | 40.5922 | 333.2279 | 285.1265 | 298.4247 |
| Hc | 29.9192 | 20.775 | 38.1087 | 26.7449 |
| Hdis | 29.9648 | 20.874 | 38.1613 | 26.7975 |
| Ha | 29.9252 | 20.8344 | 38.1217 | 26.7579 |
| SD | 0 | 0 | 0 | 0 |
| HP | 0 | 0 | 0 | 0 |
| OB | 0 | 0 | 0 | 0 |

TABLE 7-continued

DIS Sight Reductions 2017 Jul. 16 UTC Fix

| Value | Jupiter | Saturn | Deneb | Altair |
|---|---|---|---|---|
| Ho | 29.8979 | 20.7929 | 38.1013 | 26.7263 |
| p | −0.0214 | 0.0179 | −0.0074 | −0.0186 |
| z | 228.4241 | 153.4545 | 59.6862 | 103.3395 |

The fix at the time of the last sight:

Fix: 2017-07-16 01:56:04UTC 42° 45.11' N 086° 59.88' W

Ellipse: a: 2.96 nmi, b: 2.23 nmi, theta: −17.14876

Standard Deviation: 1.46 nmi, GPS Agreement: 2.39 nmi

Figure 24:
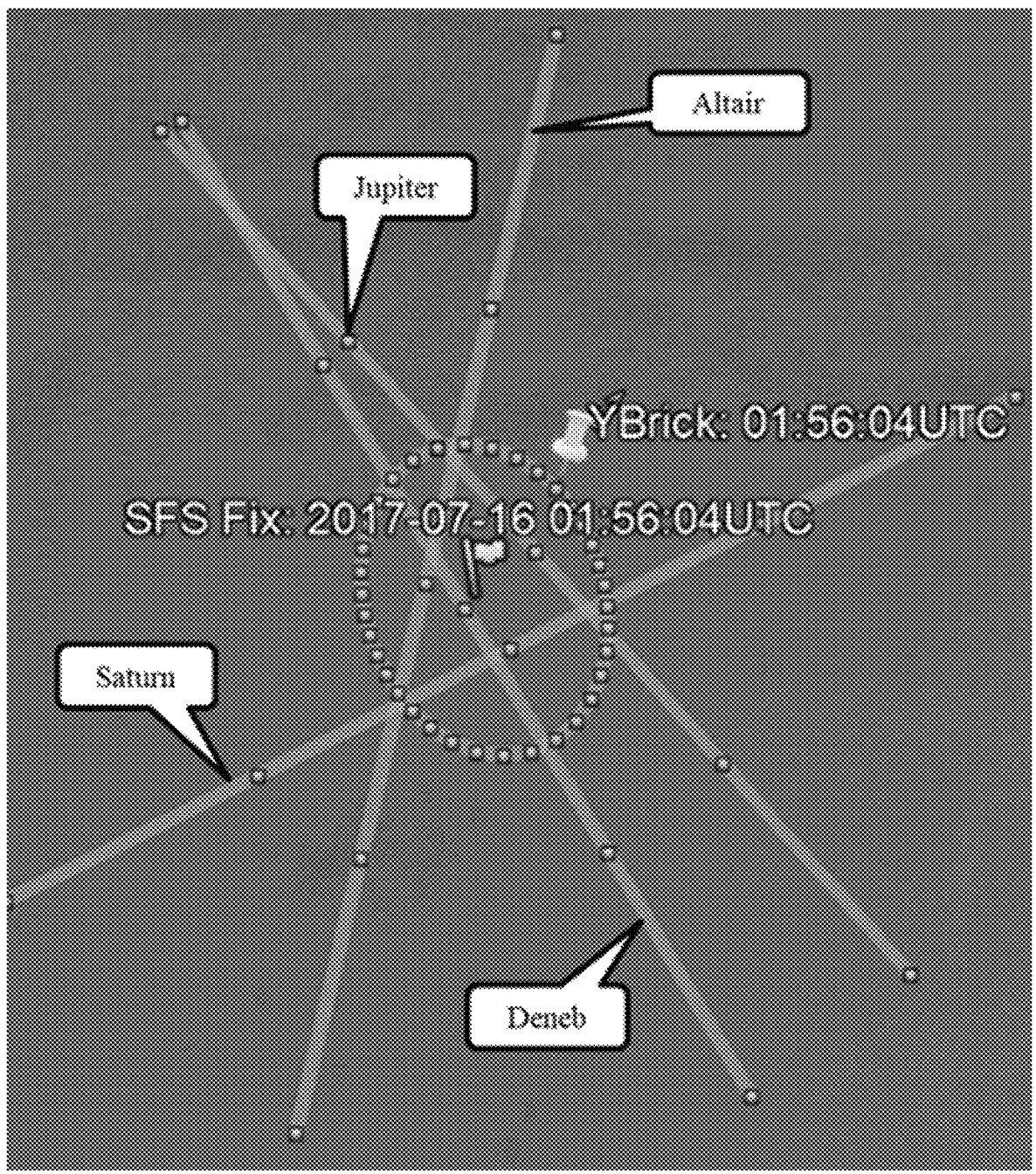
FIG. 24 illustrates a DIS Fix 2017-07-16 in Google Earth® derived from the images in FIG. 20.
Figure 25:
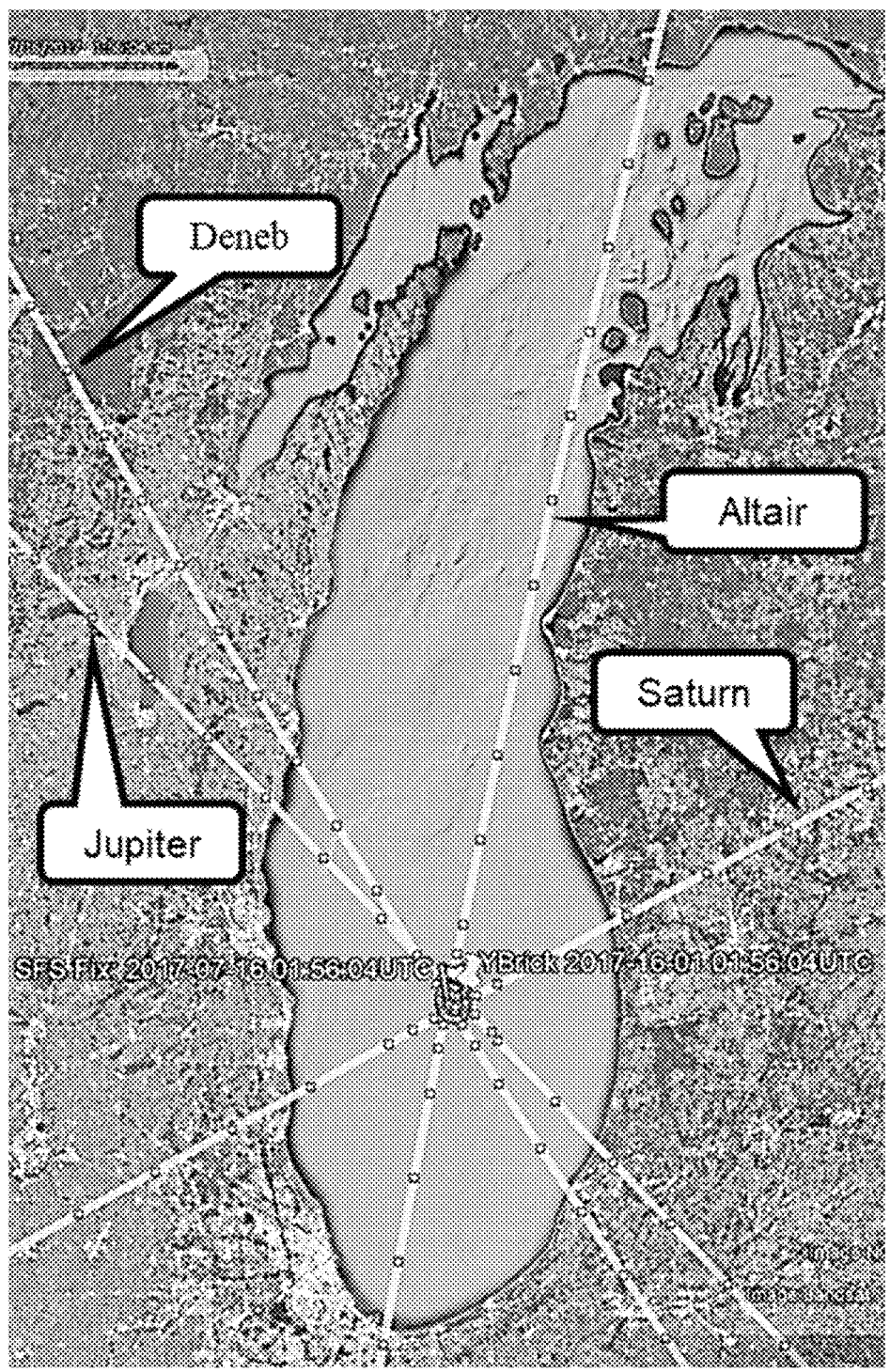
FIG. 25 illustrates a Fix 2017-07-16 at wide zoom with circles of altitude in Google Earth®, derived from the images in FIG. 20.
Figure 26:
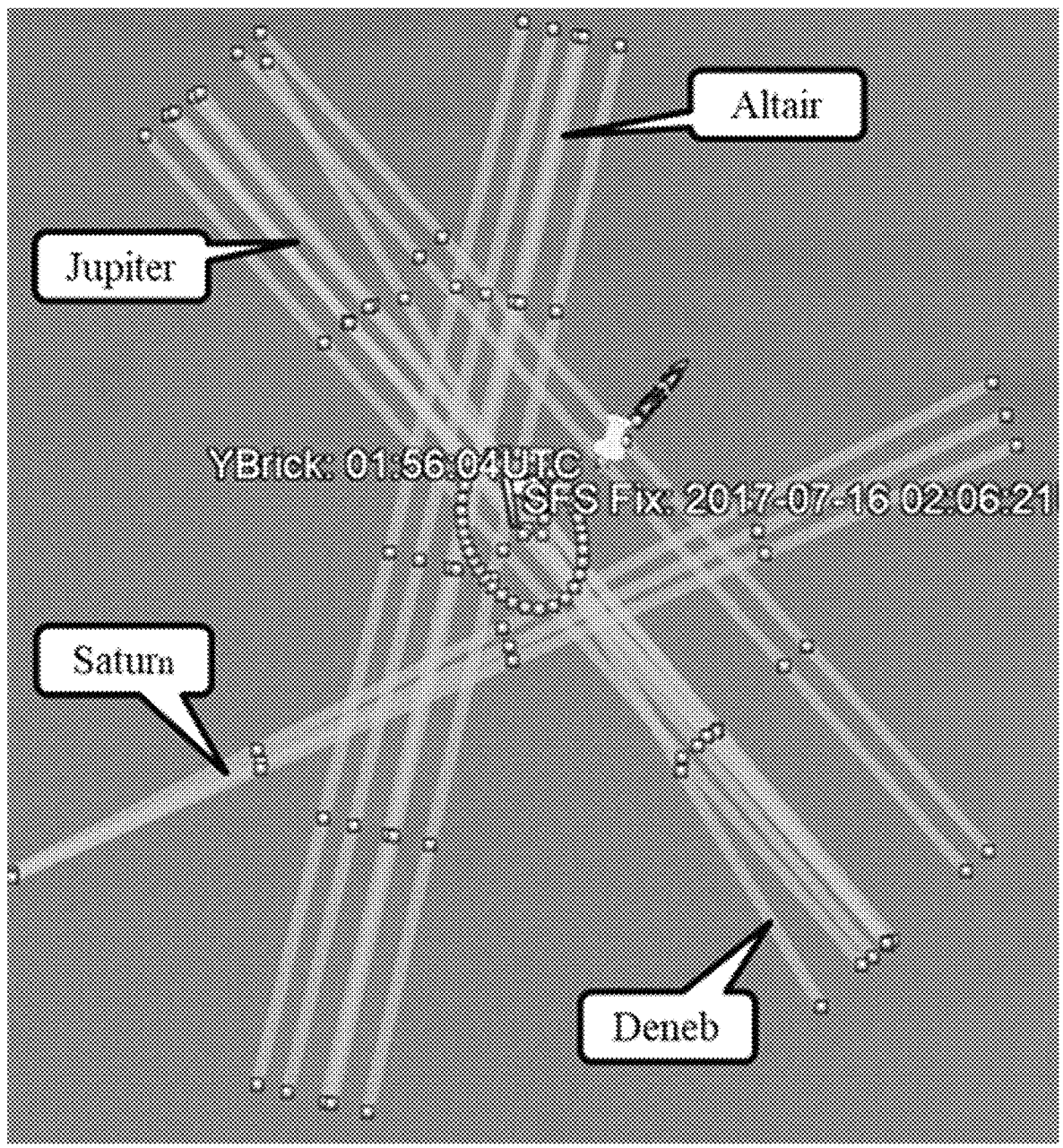
FIG. 26 illustrates a Fix from all 17 images reduced to LoPs.

The DIS software exported the fix in GPX format (GPS Exchange Format) for visualization using various plotting products. The fix is displayed in FIGS. 24 & 25 and in the bottom status bar of FIG. 21. FIGS. 24, 25 & 26 are screen shots of Google Earth® that were used to view the fix expressed in GPX output.

The vessel was equipped with Yellow Brick® (YBrick) tracking and is shown as an independent check of precision.

FIG. 24 shows:

1) The lines of position of Jupiter, Altair, Saturn, & Deneb are labeled.
2) The fix is the flag labeled SFS Fix followed by the fix time, which is the time of the last observation.
3) The Ellipse of 95% (p-value 0.05) confidence is drawn.
4) Yellow Brick® reference is shown as the "push pin". Note the YBrick tracking reads on a constant schedule. The closest YBrick measurement was at 02:02:00 UTC. YBrick position was retired back along the vessels track to the time of the fix 01:56:04 UTC
5) The small line segment above the yellow pin is the vessel's DR track over the period of the observations.
6) The vector from the DIS celestial fix to the Yellow Brick® fix is 2.4 nmi at 37.9 degrees.

C) Reproducibility of the Celestial Fix

A total of 17 images were captured during nautical twilight on Lake Michigan during the time window from 2017-07-16 01:51:37-02:06:21 UTC.

To assess the reproducibility of the technique, all 17 image files were reduced to Lines of Position (LoP) and added to a single fix listed below and visualized in FIG. 26.

Fix: 2017-07-16 02:06:21 UTC 42° 46.01' N 086° 59.85' W

Ellipse: a: 1.49 nmi, b: 1.03 nmi, theta: −22.26755

Std. Dev: 1.43 nmi, GPS Agreement: 1.68 nmi

Figure 27:
FIG. 27 illustrates a Fix 2016-12-28 UTC.

To show the device and method used under different conditions, a fix was taken on Jupiter Island Fla. on Dec. 28, 2016 and is shown in Table 9 and FIG. 27. The observation conditions are shown in Table 8:

TABLE 8 observation conditions on Jupiter Island FL on Dec. 28, 2016.

| | |
|---|---|
| Speed | 0 kts |
| Pressure | 1023 mbar |
| Temp | 23.9° C. |
| HoE: | 1.2 m (Height of Eye) |
| DR Pos: | 27°00.00' N, 080°00.00' W |

Fix: 2016-12-28 23:14:15UTC 26°57.65' N 080°04.90' W
Ellipse: a: 2.32779 nmi, b: 2.48073 nmi, theta: −10.95992
Std. Dev: 1.55069 nmi, GPS Agreement: 0.30 nmi (558 m)

TABLE 9

DIS Sight Reductions 2016 Dec. 28 UTC Fix

| Value | Mirphak | Kocab | Polaris | Menkar | Bellatrix |
|---|---|---|---|---|---|
| UTC | 23:01:09 | 23:06:27 | 23:06:39 | 23:14:05 | 23:14:15 |
| DR lat | 27°00.00' | 27°00.00' | 27°00.00' | 27°00.00' | 27°00.00' |
| DR lon | −80°00.00' | −80°00.00' | −80°00.00' | −80°00.00' | −80°00.00' |
| RA | 3.4054 | 38.8451 | 2.5302 | 27.038 | 29.4189 |
| dec | 49.861 | 74.1556 | 89.2641 | 4.0894 | 6.3497 |
| LST | 0.2031 | 0.2917 | 0.295 | 0.4192 | 0.422 |
| GHA | 32.0456 | 221.7791 | 46.5522 | 40.7988 | 5.1277 |
| LHA | 311.9656 | 141.699 | 326.4722 | 320.7187 | 285.0476 |
| Hc | 46.9549 | 14.1926 | 27.5736 | 46.0955 | 16.2678 |
| Hdis | 46.9892 | 14.2883 | 27.6335 | 46.1168 | 16.3873 |
| Ha | 46.9568 | 14.256 | 27.6012 | 46.0845 | 16.355 |
| SD | 0 | 0 | 0 | 0 | 0 |
| HP | 0 | 0 | 0 | 0 | 0 |
| OB | 0 | 0 | 0 | 0 | 0 |
| Ho | 46.9419 | 14.1944 | 27.5707 | 46.0691 | 16.3014 |
| p | −0.013 | 0.0019 | −0.0029 | −0.0264 | 0.0336 |
| z | 44.6061 | 349.9477 | 0.4585 | 114.4012 | 91.0989 |

DISCUSSION

The data show celestial navigation using digital imaging in the role of a sextant. The DIS is a practical reality due to the rapid advancement in the resolution and sensitivity of commonly available detectors. The device used is a compromise to balance two concerns: resolution and field of view. The field of view is 54.3 degrees and the detector has 7360×4912 pixels yielding 0.44 minutes of arc (26.56 arc seconds) resolution or not quite half the resolution of a traditional modern professional sextant (0.2 minutes of arc).

DIS Resolution: 0.00738 degrees arc

Sextant Resolution: 0.00331 degrees arc

At the resolution of the camera/lens combination, one pixel distance (0.44 nmi) is significant to the quality of the sight reduction, which is not ideal.

A ~90 degree constant distance "Fish-Eye" would provide a better range of altitudes but would have further diluted resolution. Both lenses could be used with different calibrations.

Even with the resolution deficit of the DIS, the fix precision rivals what one might expect from a mechanical-optical sextant in the hands of an experienced user. The advantages of $\frac{1}{125}$th sec or faster exposure, camera time stamping, and non-real time altitude measurement may, in a practical sense, outweigh the resolution advantage.

Higher resolution detectors do equal and exceed the resolution of mechanical sextants. At some point, factors like atmospheric turbulence rather than resolution will limit gains in precision.

Figure 23:
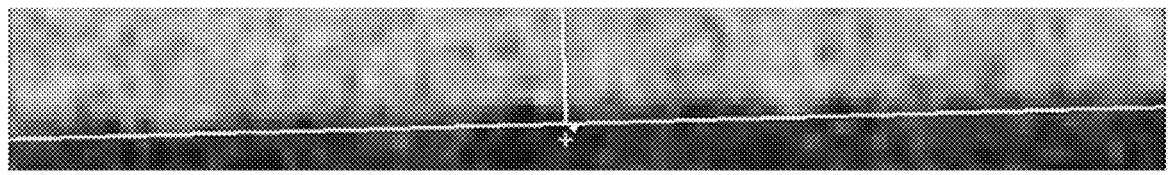
FIG. 23 illustrates Horizon Uncertainty.

Precision sensitivity is most notable in selection of the horizon pixel. Star pixel centroid is accomplished by using AstroImageJ Single Aperture Photometry Tool. However, what looks like a sharp horizon at the scale of the full image can exhibit several pixels of uncertainty when viewed at a discernable pixel scale (FIGS. 22 & 23). Doubtless the method used here can be improved by a horizon detection function to yield a more precise and reproducible line of the horizon to measure against.

An image stabilized camera would reduce error from camera movement, and simply reducing the exposure time is a planned experiment to improve precision. It appears that further trading of light gathering for positional precision is warranted.

The detailed reduction data displayed in Tables 3 & 4 are needed to illustrate the method but would typically not be of interest to the practical navigator. With ACN (Automated Celestial navigation) this data would be as obscure to ACN users as GPS computations are to GPS users.

Looking forward to fully autonomous celestial navigation, the system used lacks the following well described abilities for full autonomy:

1) Digital image processing for horizon detection. This ability would also increase reproducibility by eliminating a significant opportunity for human error.
2) Automated capture of observation conditions (temperature, pressure, and height of eye).
3) Automated capture of vessel navigational data (speed, heading, and DR position).
4) Integrated bearing compass. A bearing compass on the camera to captured azimuth in the image data would improve the reliability of automated identification of the observed body. Sorting possible objects by observed altitude alone can occasionally make body selection ambiguous. Adding even a course azimuth to the sort would remove nearly all uncertainty from automated body identification. Pattern recognition of stars in the image is usable but subject to how many stars are detectable due to atmospheric conditions ("seeing") and background lighting (FIG. 22). Sorting by altitude and azimuth seems likely to remain an important means of body identification when a DR position is available.

CONCLUSION

We report the use of digital imaging to produce a celestial fix at sea. The fix precision is expressed by an ellipse of 95% confidence (p-value 0.05) 2.96×2.23 nmi for the major and minor radii. We also present the calibration of a rectilinear camera and lens to a mean error in measured angular distance of 0.004375 degrees and a maximum error of 0.00958 degrees. Evaluation of all 17 images captured during nautical twilight reveal a positional standard deviation for the equipment and method employed of 1.43 nmi.

The use of digital imaging to produce celestial fixes allows for an electronic "closed loop" solution for celestial navigation, meaning activities from data capture to plotting of position are possible with little or no more human input than is required to operate a GPS device. Such automation combined with improvements to the equipment and methods presented here may combine to make celestial navigation more precise, practical, and pervasive.

The invention claimed is:

1. A system for measuring angular distance between two objects, the system comprising:
   a) an imaging device enabled to make and store a digital image of two objects separated by a known angular distance;
   b) a computational element, comprising: a microprocessor, a means of user input, a means of user output, non-transitory computer readable memory medium; and computer readable instructions stored on the non-transitory computer readable memory medium, enabling the computational element to:
      i) accept input of focal length, size of image detector, and number of pixels of the image detector;
      ii) accept selection of a pixel representative of each of the two objects of the digital image of the two objects separated by a known angular distance;
      iii) accept input of the known angular distance for the pixels selected to represent the two objects of the digital image of the two objects separated by the known angular distance;
      iv) determine pixels per arc from the digital image of the two objects on the digital image of the two objects separated by known angular distance;
      v) correct the pixels per arc for distortion intrinsic to the imaging device where the pixels per arc were not constant across the image: and
      vi) store the input and determinations of b) i)-b) v) as calibration parameters;
   c) said imaging device further enabled to make and store a digital image of two objects of unknown angular distance;
   d) said computer readable instructions further enabling the computational element to:
      i) accept the selection of 1 pixel representative of each object of unknown angular distance on a digital image of two objects of unknown angular distance;
      ii) apply said calibration parameters to determine the angular distance between the 2 objects of unknown angular distance; and
      iii) output or display said angular distance determination.

2. The system of claim 1 wherein, selection of pixels is performed by the computational element in communication with an image database.

3. The system of claim 1 wherein, selection of pixels is performed by the user using digital image processing software.

4. The system of claim 3 wherein the digital image processor is ImageJ.

5. The system of claim 1, further comprising:
   a) a celestial data base in communication with the computational element;
   b) computer readable instructions further enabling the computational element to:
      i) reference the celestial database to identify a celestial body or celestial object in a digital image;
      ii) utilize the celestial coordinates of the celestial bodies or celestial objects of the digital image to derive an angular distance between the celestial bodies or celestial objects;
      iii) utilize the angular distance derived from the celestial bodies or celestial objects as the known angular distance in step b) iii) of claim 1;
   c) wherein said digital image of two objects of unknown angular distance in step c) of claim 1, comprises one celestial body or celestial object, and one earths horizon as the two objects of unknown angular distance;
   d) wherein said angular distance determined in step d) ii) of claim 1 is a sextant altitude for the celestial body or celestial object for the purposes of navigation.

6. The system of claim 5, further comprising computer readable instructions enabling the computational element to:
   a) calculate an observed altitude from said sextant altitude;
   b) determine a sight reduction from said observed altitude;
   c) determine lines of positions from two or more sight reductions and reference to the celestial database;
   d) determine a geographical position of the imaging device from the intersection of a plurality of lines of positions;
   e) output any one or more of a)-d).

7. The system of claim 5, wherein the computer readable instructions further enable the computational element to correct the pixels per arc for refraction at any distance from the zenith.

8. A method of calibrating the system of claim 5, comprising the steps of:
   a) inputting into computational element, focal length, size of image detector, and number of pixels of the image detector and storing values as calibration parameters;
   b) capturing a digital image of 2 or more celestial bodies of known angular distance and importing the digital image of 2 or more celestial bodies of known angular distance into computational element;
   c) selecting representative pixels of the 2 or more celestial bodies of known angular distance;
   d) allowing the computational element to accesses the celestial data base to identify the celestial bodies and apply the known angular distance for the pixels selected to represent the celestial bodies of known angular distance; and
   e) allowing the computational element to determine pixels per arc from the digital image of celestial bodies of known angular distance and correct the pixels per arc for distortion and store the distortion corrected pixels per arc as calibration parameters.

9. The method of claim 8, further comprising steps to determine a sextant altitude, the steps of claim 8 further comprising:
   a) capturing and storing a digital image of 1 or more celestial bodies and earth horizon;
   b) selecting representative pixels for the 1 or more celestial bodies and earths horizon directly below each celestial body;
   c) allowing the computational element to apply the calibration parameters to the representative pixels of the 1 or more celestial bodies and earth horizon to determine the angular distance between the 1 or more celestial bodies and earth horizon; and
   d) allowing the computational element to output the angular distance between the 1 or more celestial bodies and earth horizon as sextant altitudes.

10. The method of claim 8, further comprising steps to determine a Fix, the steps of claim 8 further comprising:
   a) capturing and storing a digital image of 1 or more celestial bodies and earth horizon;
   b) selecting representative pixels for the 1 or more celestial bodies and earths horizon directly below each celestial body;
   c) allowing the computational element to apply the calibration parameters to the representative pixels of the 1 or more celestial bodies and earth horizon to determine the angular distance between the 1 or more celestial bodies and earth horizon;
   d) allowing the computational element to display the angular distance between the 1 or more celestial bodies and earth horizon as Sextant Altitudes;
   e) deriving observed altitudes from sextant altitudes by correcting for environmental conditions;
   f) reducing observed altitudes to Lines of Position;
   g) deriving a Fix from the intersection of a plurality of lines of position. Include error estimates for 3 or more Lines of Position; and
   h) displaying the fix or one more Lines of Position.

11. The system of claim 1, whereby the calibration parameters are input and stored in the non-transitory computer readable memory medium.

12. A method of using the calibrated system of claim 11 to measure angler distance, comprising the steps of:
   a) capturing and storing a digital image of 2 or more objects of unknown angular distance;
   b) selecting representative pixels of 2 or more objects of unknown angular distance;
   c) applying calibration parameters to the representative pixels of the digital image of 2 objects of unknown angular distance to determine the angular distance between the 2 objects; and
   d) displaying the angular distance between the 2 objects.

13. A method of using the system of claim 1, to determine unknown angular distance, comprising the steps of:
   a) inputting into computational element, focal length, size of image detector, and number of pixels of the image detector and storing values as calibration parameters;
   b) capturing a digital image of 2 or more objects of known angular distance and importing the digital image of 2 or more objects of known angular distance into computational element;
   c) selecting representative pixels of the 2 or more objects of known angular distance;
   d) inputting the known angular distance for the pixels selected to represent each object of the known angular distance; and
   e) determining pixels per arc from the digital image of objects of known angular distance and correcting the pixels per arc for distortion and storing the distortion corrected pixels per arc as a calibration parameter
   f) capturing and storing a digital image of 2 or more objects of unknown angular distance;
   g) selecting representative pixels of 2 or more objects of unknown angular distance;
   h) applying calibration parameters to the representative pixels of the digital image of 2 objects of unknown angular distance to determine the angular distance between the 2 objects; and
   i) displaying the angular distance between the 2 objects.

* * * * *